US007877325B2

(12) United States Patent
Bishop et al.

(10) Patent No.: US 7,877,325 B2
(45) Date of Patent: Jan. 25, 2011

(54) SYSTEMS AND METHODS FOR SETTLING AN ALLOCATION OF AN AMOUNT BETWEEN TRANSACTION ACCOUNTS

(75) Inventors: Fred A. Bishop, Glendale, AZ (US); Bansi L. Sharma, New York, NY (US); Tracey R. Thomas, Boonton, NJ (US)

(73) Assignee: American Express Travel Related Services Company, Inc., New York, NY (US)

( * ) Notice: Subject to any disclaimer, the term of this patent is extended or adjusted under 35 U.S.C. 154(b) by 144 days.

(21) Appl. No.: 12/355,527

(22) Filed: Jan. 16, 2009

(65) Prior Publication Data
US 2009/0125426 A1 May 14, 2009

Related U.S. Application Data

(60) Continuation-in-part of application No. 11/695,152, filed on Apr. 2, 2007, now Pat. No. 7,756,785, which is a division of application No. 09/704,379, filed on Nov. 2, 2000, now Pat. No. 7,426,492.

(60) Provisional application No. 60/163,824, filed on Nov. 5, 1999, provisional application No. 60/164,075, filed on Nov. 5, 1999.

(51) Int. Cl.
*G06Q 40/00* (2006.01)
(52) U.S. Cl. .......................................... 705/39; 705/38
(58) Field of Classification Search .................. 705/37, 705/38, 39
See application file for complete search history.

(56) References Cited

U.S. PATENT DOCUMENTS

| | | | |
|---|---|---|---|
| 4,587,379 A | 5/1986 | Masuda | |
| 4,799,156 A | 1/1989 | Shavit et al. | |
| 4,823,264 A | 4/1989 | Deming | |
| 5,016,270 A | 5/1991 | Katz | |
| 5,136,633 A | 8/1992 | Tejada et al. | |
| 5,329,589 A | 7/1994 | Fraser et al. | |
| 5,420,926 A | 5/1995 | Low et al. | |
| 5,477,040 A * | 12/1995 | Lalonde | 235/380 |
| 5,479,510 A | 12/1995 | Olsen et al. | |
| 5,485,510 A | 1/1996 | Colbert | |
| 5,677,955 A | 10/1997 | Doggett et al. | |
| 5,717,989 A | 2/1998 | Tozzoli et al. | |
| 5,724,424 A | 3/1998 | Gifford | |
| 5,745,554 A | 4/1998 | Rozetti | |
| 5,794,207 A | 8/1998 | Walker et al. | |
| 5,822,737 A | 10/1998 | Ogram | |

(Continued)

OTHER PUBLICATIONS

Requirement for Restriction/Election mailed Sep. 27, 2004 in U.S. Appl. No. 09/704,379 by Fred Bishop.

(Continued)

*Primary Examiner*—Jagdish N Patel
(74) *Attorney, Agent, or Firm*—Snell & Wilmer L.L.P.

(57) ABSTRACT

A financial account issuer facilitating transactions between accounts is disclosed. The invention provides sellers with an irrevocable method of receiving funds from a purchaser and for improving purchaser willingness to transact with an unknown party. The invention also enables the allocation of a portion or all of a charge or loyalty points to different transaction accounts issued by different issuers, or to sub-accounts.

21 Claims, 23 Drawing Sheets

U.S. PATENT DOCUMENTS

| | | | |
|---|---|---|---|
| 5,825,881 A | 10/1998 | Colvin, Sr. | |
| 5,826,241 A | 10/1998 | Stein et al. | |
| 5,826,245 A | 10/1998 | Sandberg-Diment | |
| 5,878,139 A | 3/1999 | Rosen | |
| 5,883,810 A | 3/1999 | Franklin et al. | |
| 5,899,980 A | 5/1999 | Wilf et al. | |
| 5,903,721 A | 5/1999 | Sixtus | |
| 5,903,878 A | 5/1999 | Talati et al. | |
| 5,909,492 A | 6/1999 | Payne et al. | |
| 5,949,044 A | 9/1999 | Walker et al. | |
| 5,963,917 A | 10/1999 | Ogram | |
| 5,970,475 A | 10/1999 | Barnes et al. | |
| 5,987,140 A | 11/1999 | Rowney et al. | |
| 6,108,639 A | 8/2000 | Walker et al. | |
| 6,108,642 A | 8/2000 | Findley | |
| 6,267,292 B1* | 7/2001 | Walker et al. | 235/379 |
| 6,295,448 B1 | 9/2001 | Hayes et al. | |
| 6,305,603 B1 | 10/2001 | Grunbok et al. | |
| 6,330,546 B1 | 12/2001 | Gopinathan et al. | |
| 6,343,738 B1 | 2/2002 | Ogilvie | |
| 6,606,606 B2* | 8/2003 | Starr | 705/36 R |
| 6,636,833 B1* | 10/2003 | Flitcroft et al. | 705/64 |
| 6,785,661 B1 | 8/2004 | Mandler et al. | |
| 7,177,836 B1 | 2/2007 | German et al. | |
| 7,194,437 B1 | 3/2007 | Britto et al. | |
| 7,225,156 B2* | 5/2007 | Fisher et al. | 705/50 |
| 7,313,543 B1* | 12/2007 | Crane et al. | 705/39 |
| 7,451,114 B1 | 11/2008 | Matsuda et al. | |
| 7,499,886 B2 | 3/2009 | Matsuda et al. | |
| 7,593,898 B1 | 9/2009 | Tsuei et al. | |
| 2002/0125312 A1 | 9/2002 | Ogilvie | |
| 2002/0143634 A1 | 10/2002 | Kumer et al. | |
| 2002/0152174 A1 | 10/2002 | Woods et al. | |
| 2003/0061157 A1* | 3/2003 | Hirka et al. | 705/39 |
| 2003/0140007 A1 | 7/2003 | Kramer et al. | |
| 2004/0049452 A1* | 3/2004 | Blagg | 705/39 |
| 2005/0097039 A1* | 5/2005 | Kulcsar et al. | 705/40 |
| 2005/0154676 A1 | 7/2005 | Ronning et al. | |
| 2005/0192895 A1* | 9/2005 | Rogers et al. | 705/39 |
| 2006/0136300 A1 | 6/2006 | Kopelman et al. | |
| 2006/0196930 A1* | 9/2006 | Hart et al. | 235/380 |

OTHER PUBLICATIONS

Non-Final Rejection mailed Dec. 29, 2004 in U.S. Appl. No. 09/704,379 by Fred Bishop.
Final Rejection mailed May 10, 2005 in U.S. Appl. No. 09/704,379 by Fred Bishop.
Advisory Action mailed Jul. 20, 2005 in U.S. Appl. No. 09/704,379 by Fred Bishop.
Non-Final Rejection mailed Oct. 17, 2005 in U.S. Appl. No. 09/704,379 by Fred Bishop.
Final Rejection mailed Mar. 30, 2006 in U.S. Appl. No. 09/704,379 by Fred Bishop.
Advisory Action mailed Aug. 14, 2006 in U.S. Appl. No. 09/704,379 by Fred Bishop.
Non-Final Rejection mailed Oct. 30, 2006 in U.S. Appl. No. 09/704,379 by Fred Bishop.
Non-Final Rejection mailed Apr. 17, 2007 in U.S. Appl. No. 09/704,379 by Fred Bishop.
Non-Final Rejection mailed Oct. 11, 2007 in U.S. Appl. No. 09/704,379 by Fred Bishop.
Final Rejection mailed Apr. 21, 2008 in U.S. Appl. No. 09/704,379 by Fred Bishop.
Advisory Action mailed May 27, 2008 in U.S. Appl. No. 09/704,379 by Fred Bishop.
Notice of Allowance mailed Jul. 16, 2008 in U.S. Appl. No. 09/704,379 by Fred Bishop.
Issue Notification mailed Aug. 27, 2008 in U.S. Appl. No. 09/704,379 by Fred Bishop.
NN 970399, Wireless Point of Sale Terminal Input/Output, Mar. 1, 1997 7.9800.
ISR and Written Opinion issued in PCT/US2000/030483.
Non-Final Rejection issued May 5, 2008 in U.S. Appl. No. 11/695,152.
Non-Final Rejection issued Nov. 19, 2008 in U.S. Appl. No. 11/695,152.
Requirement for Restriction issued Feb. 25, 2009 in U.S. Appl. No. 11/695,152.
Non-Final Office Action issued May 13, 2008 in U.S. Appl. No. 11/695,161.
Final Office Action issued Feb. 24, 2009 in U.S. Appl. No. 11/695,161.
Non-Final Office Action issued May 15, 2008 in U.S. Appl. No. 11/695,168.
Final Office Action issued Feb. 4, 2009 in U.S. Appl. No. 11/695,168.
Non-Final Office Action issued May 13, 2008 in U.S. Appl. No. 11/695,174.
Final Office Action issued Feb. 3, 2009 in U.S. Appl. No. 11/695,174.
Notice of Allowance issued Sep. 10, 2008 in U.S. Appl. No. 11/164,444.
Final Rejection issued May 15, 2009 in U.S. Appl. No. 11/695,152.
Advisory Action issued Jun. 1, 2009 in U.S. Appl. No. 11/695,152.
Non-Final Office Action issued Aug. 5, 2009 in U.S. Appl. No. 11/695,152.
Non-Final Office Action issued Jul 10, 2009 in U.S. Appl. No. 11/695,161.
Non-Final Office Action issued Jul. 31, 2009 in U.S. Appl. No. 11/695,168.
Advisory Action issued Apr. 8, 2009 in U.S. Appl. No. 11/695,174.
Non-Final Office Action issued Jul. 7, 2009 in U.S. Appl. No. 11/695,174.
NN 970399. Wireless Point of Sale Terminal Input/Output, Mar. 1, 1997.
PCT; Written Opinion issued in PCT/US2000/030483.
TW; Office Action dated Jul. 31, 2002 in Application No. 89123260.
AR; Office Action dated May 15, 2002 in Application No. P 00 01 05814.
USPTO; All Office Action (Non-Final, Final, Advisory Actions, Restrictions/Elections, etc.), Notices of Allowance, 892s, 1449s and SB/08As from U.S. Appl. Nos. 11/695,168; 11/695,174; 12/242,759; 12/242,766; 12/242,803; 12/242,812; 12/242,830; 12/242,842.

* cited by examiner

FIG. 18

```
┌──────────────────────────────────────────────────────────────────────┐
│ □  AMERICAN EXPRESS-MICROSOFT INTERNET EXPLORER              ▭▣☒     │
│ FILE EDIT VIEW GO FAVORITES HELP                                     │
│ ← → ○ ▯ ⌂ ⊙ ▯ ○ ⌘ ▯ ▯ ▯                                              │
│ BACK FORWARD STOP REFRESH HOME SEARCH FAVORITES HISTORY CHANNELS     │
│ FULLSCREEN MAIL PRINT                                                │
│ ADDRESS: □ HTTP://TRIBECA.SIG.BSH.COM/CONSUMER_TO_CONSUMER/BUILD/BI_2.ASP  ▽ LINK> │
├──────────────────────────────────────────────────────────────────────┤
│ ┌─────────┬─────┬───────────┬──────────────────────────┐             │
│ │AMERICAN │ITEMS│ PERSONAL  │○SMALL BUSINESS ○CORPORATIONS│  1900    │
│ │EXPRESS  │     │           │                          │             │
│ ├─────────┴─────┴───────────┴──────────────────────────┘             │
│ │▷CARDS        │ CONSUMER TO CONSUMER PAYMENTS                       │
│ │              │ VIEW INVOICES                                       │
│ │              │ STEP 43-REVIEW INFORMATION                          │
│ │              │ TO: GLORIAPUBLIC@YAHOO.COM        INVOICE#:001300925│
│ │TRAVEL &      │                              INVOICE EXPIRES:02/13/00│
│ │ENTERTAINMENT │ FROM: JOHN_SAMPLE@HOTMAIL.COM    YOUR REFERENCE#:23456│
│ │FINANCIAL PLANNING&│                    DESCRIPTION:EBAY AUCTION 44587956│
│ │INVESTING     │                                                     │
│ │EXPRESS SHOPPER│ DESCRIPTION   QUANTITY           PRICE    SUBTOTAL │
│ │              │ 34590A  APACHE    1             $300.00    $300.00  │
│ │              │ RUG                                                 │
│ │              │                              ┌───────────────────┐  │
│ │              │                              │INSURANCE     20.00│  │
│ │              │                              │SHIPPING & HANDLING 90.00│
│ │              │                              │OTHER          0.00│  │
│ │              │                              │TOTAL TO BE        │  │
│ │              │                              │CHARGED TO BUYER $410.00│
│ │              │                              └───────────────────┘  │
│ │              │ CARD INFORMATION    CARD IDENTIFICATION#  I AGREE TO THE TERMS│
│ │              │ NAME AS IT APPEARS ON THE CARD  4432     & CONDITIONS SET BY│
│ │              │ GLORIA Q. PUBLIC    EXPIRATION DATE      THE SELLER AND TO PAY│
│ │              │                     XX/XXXX              THE TOTAL CHARGES ON│
│ │              │ CARD ACCOUNT#                            THIS INVOICE.│
│ │              │ XXXX-XXXX-XXXX                                       │
│ │              │                                   1904 ──┐ ┌ACCEPT┐ │
│ │              │ BASIC CARDMEMBER'S BIRTH DATE                        │
│ │              │ 01/02/1967                                           │
│ │              │                                  I DO NOT WISH TO   │
│ │              │ BILLING ADDRESS                  PROCEED WITH THIS  │
│ │              │                                        INTERNET ZONE│
│ └──────────────┴──────────────────────────────────────────────────┘  │
│ □START □INBOX-MICRO □YAHOO MAIL □CAPEELLA LINK □LEARNING SPA □AMERICAN... □EXPLORING □MICROSOFT W... □UPLOADED DATA  10:38AM│
└──────────────────────────────────────────────────────────────────────┘
```

FIG.19A

```
┌─────────────────────────────────────────────────────────────────────┐
│ □ AMERICAN EXPRESS-MICROSOFT INTERNET EXPLORER               □□☒   │
│ FILE EDIT VIEW GO FAVORITES HELP                                    │
│ ← → ○ □ ⌂ ⊕ □ ○ ⚓ ☒ ✉ 🖶                                         │
│ BACK FORWARD STOP REFRESH HOME SEARCH FAVORITES HISTORY CHANNELS FULLSCREEN MAIL PRINT │
│ ADDRESS: HTTP://TRIBECA.SIG.BSH.COM/CONSUMER_TO_CONSUMER/BUILD/BI_2.ASP    ▽ LINK> │
├─────────────────────────────────────────────────────────────────────┤
```

| EXPRESS SHOPPER | 34590A | APACHE RUG | 1 | | $300.00 | $300.00 |

| | INSURANCE | 20.00 |
| | SHIPPING & HANDLING | 90.00 |
| | OTHER | 0.00 |
| | TOTAL | $410.00 |

1900

CARD INFORMATION
NAME AS IT APPEARS ON THE CARD
GLORIA Q. PUBLIC

CARD ACCOUNT#
XXXX-XXXX-XXXX

CARD IDENTIFICATION :
4432
EXPIRATION DATE
XX/XXXX

I AGREE TO THE TERMS
& CONDITIONS SET BY
THE SELLER AND TO PAY
THE TOTAL CHARGES ON
THIS INVOICE.

1904 ── [ACCEPT]

BASIC CARDMEMBER'S BIRTH DATE
01/02/1967

BILLING ADDRESS

327 JOHNSON COURT, APT.3
CHICAGO, IL
02753

I DO NOT WISH TO
PROCEED WITH THIS

1902 ── [DECLINE]

SELLER WILL NOT SEE YOUR ACCOUNT INFORMATION.

ALL SHIPPING, HANDLING & INSURANCE ARRANGEMENTS SHOULD BE MADE PRIOR TO SUBMITTING YOUR CARD INFORMATION.

COPYRIGHT©2000 AMERICAN EXPRESS COMPANY ALL RIGHTS RESERVED. USERS OF THIS SITE AGREE TO BE BOUND BY THE TERMS OF THE AMERICAN EXPRESS WEB SITE RULES AND REGULATIONS. VIEW WEB SITE RULES AND REGULATIONS AND TRADEMARKS AND PRIVACY STATEMENT OF AMERICAN EXPRESS.

FIG. 19B

SYSTEMS AND METHODS FOR SETTLING AN ALLOCATION OF AN AMOUNT BETWEEN TRANSACTION ACCOUNTS

CROSS REFERENCE TO RELATED APPLICATIONS

This application is a continuation in part, and claims priority to, U.S. patent application Ser. No. 11/695,152, filed on Apr. 2, 2007. The '152 application claims priority to U.S. Pat. No. 7,426,492, issued on Sep. 16, 2008. The '492 patent claims benefit from provisional application Ser. No. 60/163,824, filed Nov. 5, 1999, and provisional application Ser. No. 60/164,075, filed Nov. 5, 1999. All of the foregoing are hereby incorporated by reference.

FIELD OF THE INVENTION

The present invention generally relates to financial transactions and, more particularly, to the facilitation of transactions between two accounts.

BACKGROUND OF THE INVENTION

The advent of the Internet has rendered electronic commerce (e-commerce) one of the fastest growing segments of the global economy. The growth of e-commerce is due, in part, to the ever-expanding array of goods and services available to online users and the ease with which Internet access can be obtained. Each year, as general use of, and familiarity with, the Internet becomes more pervasive, the number of commercial transactions facilitated by the Internet is expected to escalate dramatically. The Internet is easily accessible, and the products and services available to users of the network are virtually limitless. In addition to allowing large merchants to sell products and services, the Internet offers a platform through which geographically remote small merchants and individuals can easily conduct a variety of transactions with each other. Thus, the Internet represents an opportunity for the exercise of unparalleled consumer purchasing power.

However, a number of hurdles impedes the typical Internet user from engaging in a variety of online transactions and, therefore, from effectively leveraging this purchasing power. As the number and scope of transactional opportunities available to Internet users expand, individual users seeking to exploit these opportunities are squarely confronted with the significant challenge of transferring and receiving monetary value online, regardless of whether the transfer and/or receipt of monetary value culminates in an online sales transaction or whether it effects a simple funds transfer between individual users. While the Internet has become an extraordinarily efficient mechanism for the dissemination of information, the development of effective, secure means for engaging in online transactions for value has proved problematic and has been a significant factor in slowing the acceptance and growth of e-commerce.

Generally, methods of transferring and receiving funds for online transactions can be separated into two broad categories: online and off-line. Online methods of transferring funds typically include transactions involving either the transmission of credit card information or the use of some form of digital cash. However, many individual Internet users are acutely aware that the transmission of credit card numbers over the Internet carries the risk of theft from unscrupulous computer hackers and thieves who have the ability to tap into servers connected to the Internet. Since credit card numbers typically comprise sixteen-digit numbers having a publicly known pattern, once a computer hacker has accessed an appropriate server, the hacker can simply search the server for messages containing numbers having a recognized pattern and enjoy a fair degree of confidence that the results of such a search will yield messages that likely correspond to valid credit cards. Off-line methods are usually safer in this regard, as they may require that a check or some other cash equivalent, such as a money order, be sent through the mail. Nevertheless, this latter approach is generally cumbersome, time consuming, and commonly perceived as troublesome to the average Internet user. Moreover, none of these methods, either online or off-line, sufficiently addresses the logistics involved in satisfactorily coordinating both the transfer of monetary value from a first user to a second user and the transfer of goods, services, or other value from the second user to the first user.

Another hurdle that often impedes widespread acceptance of commercial transactions between individual Internet users is that, since the Internet facilitates remote person-to-person communication, most online transactions suffer from a tenuous connection between the parties to the transaction. For example, unlike the experience provided by conventional 'brick and mortar' stores, in the case of a typical online transaction involving the purchase of goods, online purchasers generally do not interact personally with sellers and often do not receive the same level of customer service due to the nature of the seller involved in the transaction, as well as the character of Internet communications. Although purchasers and sellers occasionally can communicate effectively either online or by telephone, purchasers often cannot examine the quality of the goods that they are interested in purchasing. Frequently, an individual purchaser's inability to inspect the goods prior to remitting payment and/or the purchaser's lack of knowledge of the seller's integrity, in conjunction with other factors, creates sufficient apprehension in a purchaser's mind to derail an intended online purchase. Moreover, even if an individual purchaser overcomes an initial hesitancy and decides to engage in a online transaction with an individual seller, the nature of the transaction is such that the purchaser generally has little recourse in the event that the seller fails to deliver the goods or services as promised or that the goods or services are damaged or otherwise misrepresented. Conversely, the seller also has little recourse should the purchaser ultimately decide to abandon the transaction.

In the context of commercial transactions conducted between individual Internet users, an additional shortcoming of conventional payment schemes is that there are few ways for an individual purchaser to transfer monetary value to an individual seller, with the exception of cash, such that the seller may use the value transferred without first processing the transfer instrument by, for example, depositing the instrument with a bank or converting it into cash. In other words, the recipient of a check or other negotiable instrument must use a financial institution to mediate the conversion of the transferred value into value that the recipient can use in its own behalf. Furthermore, using conventional means for transferring currency between individuals, a seller may not receive financial tender until two to four weeks after performance of a service or shipment of the goods to the individual purchaser. Moreover, since a seller frequently has inventory costs associated with the particular goods offered for sale, this can result in the loss of valuable interest, pending the arrival of a payment through the mail and/or sufficient time for a bank deposit of that payment to clear the seller's bank account.

Furthermore, in the case of an online seller who is not a large merchant and who generally is not capable of accepting credit card payments, the ability to engage in a particular transaction with another Internet user may necessitate that the seller enter into an agreement with a credit card issuer to enable the seller to receive monetary value from the other Internet user. Not only are such agreements time consuming and costly, but conducting a financial transaction in accordance with such an agreement often requires the seller to communicate confidential information, such as credit card numbers, to third parties, such as credit card issuers, thereby risking the security of the confidential information. Although alternative payment schemes, such as digital money systems (e.g., DigiCash, e-Cash, etc.) are readily envisioned, most are still in the early stages of development and no standards regarding their use have been established as of yet.

Significantly, the foregoing factors frequently adversely impact an individual user's willingness to engage in online commercial transactions at all. Thus, the volume of conventional online and off-line transactions for exchanging monetary value is reduced. These losses may be due either to the individual seller's inability to process credit card transactions or to the individual purchaser's apprehension regarding acceptance of the risks associated with remitting online payments. Consequently, there is a need for systems and methods which enable remote individuals, such as Internet users, to transfer monetary value in exchange for goods, services, or other value in a secure manner. There is also a need for systems and methods which enable remote individuals to receive monetary value from each other and to utilize the value represented by the funds transfer immediately. There is also a need for systems and methods which enable individuals who do not typically process credit card transactions to receive monetary value from other individuals without being required to communicate confidential information to a third party and possibly risking a breach in the security of such information. There is an additional need for systems and methods which permit an individual seller to receive pre-authentication or pre-authorization of an individual purchaser's ability to transfer sufficient funds to complete a commercial transaction. There is also a need for systems and methods which reduce the risks associated with commercial transactions between remote individuals. Finally, there is also a need for systems and methods which provide dispute resolution mechanisms to remote individuals engaging in commercial or financial transactions conducted, for example, over a distributed computer network.

SUMMARY OF THE INVENTION

The present invention facilitates commercial transactions involving the exchange of monetary value for goods, services, or other value between remote individuals, such as users of a distributed computer network or Internet users. The present invention provides remote sellers with an irrevocable means of receiving funds from a remote purchaser; means for improving purchaser willingness to transact with an unknown party; transaction tracking; and rapid funds availability. The present invention also provides remote purchasers with means for making a secure, confidential transfer of funds; means for immediate initiation of shipment by a seller; means for releasing funds to a seller only after approval of the goods, services, or other value received from the seller; means for demonstrating proof of payment; and means for having some level of recourse against a remote seller.

The transfers discussed herein may be related to a purchase transaction, an exchange of an item (e.g., good, service, information, experience, access, entertainment, etc), no item exchange, a loan to another account (e.g., debiting a loan amount from a first account and charging a loan amount to a second account), transferring credit to another account, cost splitting, budgeting, spend compartmentalization, gifting, currency exchanges, currency exchange rates, loyalty points, monetary equivalents, non-monetary items and/or the like.

More particularly, the system and method enables a financial account issuer to facilitate a transaction by: receiving, at the financial account issuer, a request to debit a first amount from a first financial account having a first identifier associated with the first financial account, wherein the financial account issuer issued the first financial account, and wherein the financial account issuer comprises a server; receiving, at the financial account issuer, a request to credit at least a portion of the first amount to a second financial account having a second identifier associated with the second financial account; determining, by the financial account issuer, if at least one of the request to debit the first financial account or the request to credit the second financial account is fraudulent; facilitating debiting, by the financial account issuer, the first amount from the first financial account, if the request to debit the first financial account is not fraudulent; and, facilitating crediting, by the financial account issuer, at least a portion of the first amount to the second financial account, if the request to credit the second financial account is not fraudulent.

Registration of either a first party or a second party may include providing the transaction mechanism with a suitable financial account identifier, such as a card number, demand deposit account (DDA) number, or any suitable part of the number, to identify the financial account of either the first party or the second party. Moreover, transaction information received from at least one of the first party and the second party can include a financial account identifier associated with the financial account of the first party. Furthermore, a request for a value-added service can be received from the first party and/or the second party, and receiving the request for a value-added service can further include receiving a request for a value-added service such as insurance, dispute resolution, postal tracking, and/or the like. Additionally, determining whether the transaction is acceptable can further include a credit risk analysis and/or a fraud detection analysis.

BRIEF DESCRIPTION OF THE DRAWINGS

Additional aspects of the present invention will become evident upon reviewing the non-limiting embodiments described in the specification and the claims taken in conjunction with the accompanying figures, wherein like numerals designate like elements, and:

FIG. 18 is an exemplary interface for facilitating the entry of transaction information by a user;

FIGS. 19A and 19B represent an exemplary interface depicting an exemplary transaction invoice;

DETAILED DESCRIPTION OF EXEMPLARY EMBODIMENTS

Figure 1:
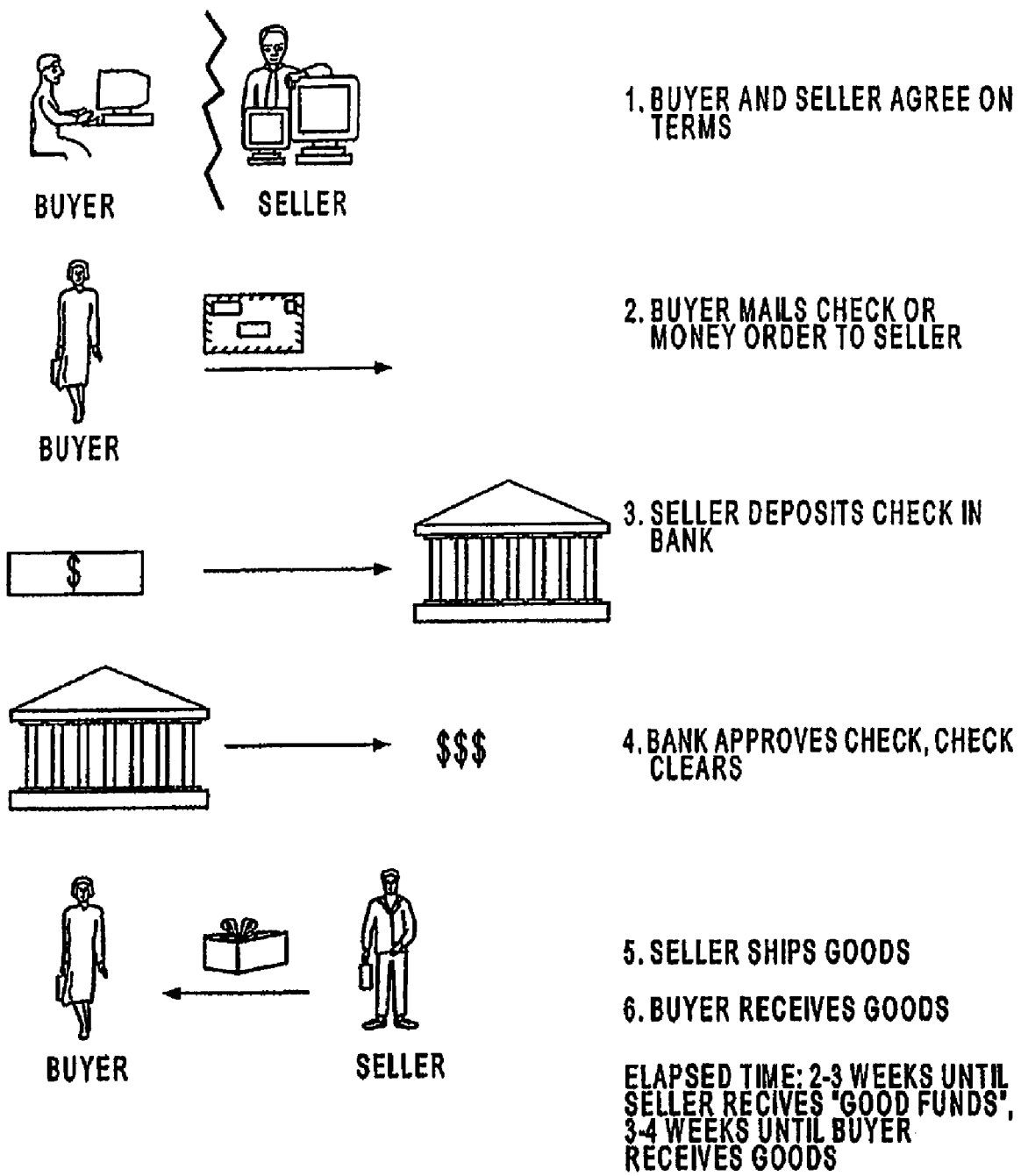
FIG. 1 is an exemplary schematic diagram of a prior art system for conducting a commercial transaction between parties who are remotely located from one another.

The present invention may be described herein in terms of functional block components, screen shots, optional selections, and various processing steps. It should be appreciated that such functional blocks may be realized by any number of hardware and/or software components configured to perform the specified functions. For example, the present invention may employ various integrated circuit components, e.g., memory elements, processing elements, logic elements, look-up tables, and the like, which may carry out a variety of functions under the control of one or more microprocessors or other control devices. Similarly, the software elements of the present invention may be implemented with any programming or scripting language such as C, C++, Java, COBOL, assembler, PERL, or the like, with the various algorithms being implemented with any combination of data structures, objects, processes, routines or other programming elements. Further, it should be noted that the present invention may employ any number of conventional techniques for data transmission, signaling, data processing, network control, and the like. For a basic introduction to cryptography, please review a text written by Bruce Schneider which is entitled "Applied Cryptography: Protocols, Algorithms, And Source Code In C," published by John Wiley & Sons (second edition, 1996), which is hereby incorporated by reference.

It should be appreciated that the particular implementations shown and described herein are illustrative of the invention and its best mode and are not intended to otherwise limit the scope of the present invention in any way. Indeed, for the sake of brevity, conventional data networking, application development, and other functional aspects of the systems (and components of the individual operating components of the systems) may not be described in detail herein. Furthermore, the connecting lines shown in the various figures contained herein are intended to represent exemplary functional relationships and/or physical couplings between the various elements. It should be noted that many alternative or additional functional relationships or physical connections may be present in a practical electronic transaction system.

It will be appreciated that many applications of the present invention could be formulated. One skilled in the art will appreciate that the network may include any system for exchanging data or transacting business, such as the Internet, an intranet, an extranet, WAN, LAN, satellite communications, and/or the like. The users may interact with the system via any input device such as a keyboard, mouse, kiosk, personal digital assistant, handheld computer (e.g., Palm Pilot®), cellular phone, and/or the like. Similarly, the invention could be used in conjunction with any type of personal computer, network computer, workstation, minicomputer, mainframe, or the like running any operating system such as any version of Windows, Windows NT, Windows 2000, Windows 98, Windows 95, MacOS, OS/2, BeOS, Linux, UNIX, or the like. Moreover, although the invention is frequently described herein as being implemented with TCP/IP communications protocols, it will be readily understood that the invention could also be implemented using IPX, Appletalk, IP-6, NetBIOS, OSI, or any number of existing or future protocols. Moreover, the system contemplates the use, sale, or distribution of any goods, services, or information over any network having similar functionality described herein.

The customer and merchant may represent individual people, entities, or businesses. Although labeled as a "bank," the bank may represent other types of card issuing institutions, such as credit card companies, card sponsoring companies, or third party issuers under contract with financial institutions. It is further noted that other participants may be involved in some phases of the transaction, such as an intermediary settlement institution, but these participants are not shown.

Each participant is equipped with a computing system to facilitate online commerce transactions. The customer has a computing unit in the form of a personal computer, although other types of computing units may be used, including laptops, notebooks, hand held computers, set-top boxes, and the like. The merchant has a computing unit implemented in the form of a computer-server, although other implementations are possible. The bank has a computing center shown as a main frame computer. However, the bank computing center may be implemented in other forms, such as a mini-computer, a PC server, a network set of computers, and/or the like.

The computing units are connected with each other via a data communication network. The network is a public network and assumed to be insecure and open to eavesdroppers. In the illustrated implementation, the network is embodied as the internet. In this context, the computers may or may not be connected to the Internet at all times. For instance, the customer computer may employ a modem to occasionally connect to the Internet, whereas the bank computing center might maintain a permanent connection to the Internet. It is noted that the network may be implemented as other types of networks, such as an interactive television (ITV) network.

The merchant computer and the bank computer are interconnected via a second network, referred to as a payment network. The payment network represents existing proprietary networks that presently accommodate transactions for credit cards, debit cards, and other types of financial/banking cards. The payment network is a closed network that is assumed to be secure from eavesdroppers. Examples of the payment network include the American Express®, VisaNet®, and the Veriphone® networks.

The electronic commerce system is implemented at the customer and issuing bank. In an exemplary implementation, the electronic commerce system is implemented as computer software modules loaded onto the customer computer and the banking computing center. The merchant computer does not necessarily require any additional software to participate in the online commerce transactions supported by the online commerce system.

As will be appreciated by one of ordinary skill in the art, the present invention may be embodied as a method, a data processing system, a device for data processing, and/or a computer program product. Accordingly, the present invention may take the form of an entirely software embodiment, an entirely hardware embodiment, or an embodiment combining aspects of both software and hardware. Furthermore, the present invention may take the form of a computer program product on a computer-readable storage medium having computer-readable program code means embodied in the storage medium. Any suitable computer-readable storage medium may be utilized, including hard disks, CD-ROM, optical storage devices, magnetic storage devices, and/or the like.

The present invention is described below with reference to block diagrams and flowchart illustrations of methods, apparatus (e.g., systems), and computer program products according to various aspects of the invention. It will be understood that each functional block of the block diagrams and the flowchart illustrations, and combinations of functional blocks in the block diagrams and flowchart illustrations, respectively, can be implemented by computer program instructions. These computer program instructions may be loaded onto a general purpose computer, special purpose computer, or other programmable data processing apparatus to produce a machine, such that the instructions which execute on the computer or other programmable data processing apparatus create means for implementing the functions specified in the flowchart block or blocks.

These computer program instructions may also be stored in a computer-readable memory that can direct a computer or other programmable data processing apparatus to function in a particular manner, such that the instructions stored in the computer-readable memory produce an article of manufacture including instruction means which implement the function specified in the flowchart block or blocks. The computer program instructions may also be loaded onto a computer or other programmable data processing apparatus to cause a series of operational steps to be performed on the computer or other programmable apparatus to produce a computer-implemented process such that the instructions which execute on the computer or other programmable apparatus provide steps for implementing the functions specified in the flowchart block or blocks.

Accordingly, functional blocks of the block diagrams and flowchart illustrations support combinations of means for performing the specified functions, combinations of steps for performing the specified functions, and program instruction means for performing the specified functions. It will also be understood that each functional block of the block diagrams and flowchart illustrations, and combinations of functional blocks in the block diagrams and flowchart illustrations, can be implemented by either special purpose hardware-based computer systems which perform the specified functions or steps, or suitable combinations of special purpose hardware and computer instructions.

As background, FIG. 1 illustrates an exemplary prior art method for conducting an online commercial transaction between individual users of a distributed computer network, such as the Internet. Initially, individual users contact each other over the network and agree to the terms of a transaction (step 1). If the particular transaction is a sales transaction involving goods, for example, the purchaser mails a check, money order, or other suitable negotiable instrument to the seller (step 2). Once the seller receives the negotiable instrument, the seller deposits it with an appropriate financial institution, such as a bank (step 3). When the bank clears the check through the seller's account, the seller is given access to the funds (step 4). The seller then ships the goods to the purchaser (step 5), and the purchaser receives the goods (step 6). Generally, this process involves an elapsed time of approximately two to three weeks before the seller receives "good funds" for the transaction, and three to four weeks until the purchaser receives the goods. Moreover, this process may include the purchaser disclosing his/her name and address to the seller to effect the transaction, and the purchaser has little or no recourse if either the seller fails to deliver the goods as promised or the goods are damaged or otherwise misrepresented.

The present invention comprises systems, methods, and computer program products for facilitating commercial transactions between remote individuals, wherein the transactions often include person-to-person transfers of funds. In a preferred aspect, the present invention facilitates commercial transactions comprising sales transactions conducted between remote individuals, such as transactions between users of a distributed computer network. One skilled in the art will appreciate that the phrase "person-to-person transfers of funds", as used herein, includes, for example, transfers from a financial account of a first party, which may be an individual or an entity, to the financial account of a second party, which may be an individual or an entity. One skilled in the art further will appreciate that a "financial account" or "account" can include a card account, a demand deposit account, a credit line, a money market account, a digital cash account, and/or any other financial account. Thus, a person-to-person transfer of funds can include card to card transfers of monetary value, card to demand deposit account (DDA) funds transfers, DDA to card transfers, card to credit line transfers, credit line to card transfers, and/or the like. Moreover, funds transfers in accordance with the present invention can be between financial accounts held with either the same financial institution or different financial institutions. A "financial institution", as will be appreciated by one of ordinary skill in the art, can include any suitable third party, such as a bank, a card issuer, a lender, a credit union, and/or the like.

Further, as one skilled in the art will appreciate, a "transaction card" or "card", as used herein, includes any device, code, or suitable financial instrument representing an account with a financial institution, such as a bank, a card issuer, and/or the like, wherein the device, code, or other suitable financial instrument has a credit line or balance associated with it, and wherein the credit line or balance is in a form of a financial tender having discrete units, such as currency. Moreover, a "transaction card" or "card", as used herein, includes any device, code, or financial instrument suitably configured to allow the cardholder to interact or communicate with the system, such as, for example, a charge card, credit card, debit card, prepaid card, telephone card, smart card, magnetic stripe card, bar code card, authorization/access code, personal identification number (PIN), Internet code, other identification code, and/or the like. Additionally, a "cardholder" or "cardmember" includes any person or entity which uses a transaction card and participates in the present system and may include a person who is simply in possession of a financial account identifier, such as an authorization or account code. Similarly, a "demand deposit account" may include any suitable financial account, such as a bank account (e.g., checking, savings, money market, credit line, etc.) or other financial account maintained by a third party (such as a suitably insured financial institution), such account preferably having a balance of substantially the same financial tender as the card.

Communication between the parties to the transaction and the system of the present invention is accomplished through any suitable communication means, such as, for example, a telephone network, Intranet, Internet, point of interaction device (point of sale device, personal digital assistant, cellular phone, kiosk, etc.), online communications, off-line communications, wireless communications, and/or the like. One skilled in the art will also appreciate that, for security reasons, any databases, systems, or components of the present invention may consist of any combination of databases or components at a single location or at multiple locations, wherein each database or system includes any of various suitable security features, such as firewalls, access codes, encryption, de-encryption, compression, decompression, and/or the like.

While a person-to-person transfer may generically be described as a transfer from the financial account of a first party to a financial account of a second party, for convenience and purposes of brevity and consistency, the present disclosure generally refers to the first party as the purchaser and the second party as the seller. However, it will be recognized by those of ordinary skill in the art that the seller need not provide goods or services to the purchaser in exchange for the transfer of funds. While this often may be the case, the present disclosure is not so limited and includes transactions which may be gratuitous in nature, whereby the purchaser transfers funds from their financial account to the financial account of the seller without the seller providing any goods, services, or other value in exchange.

In accordance with an aspect of the present invention, a person-to-person funds transfer may be facilitated by any suitable financial institution, such as a card issuer like American Express® Company for example, which suitably provides credit risk analysis and fraud risk analysis in essentially real-time, unlike other card-based fund transfer schemes which rely on third parties to facilitate such services. Utilization of third-party credit risk and fraud risk analyses, such as used in conventional funds transfer schemes, not only may increase the amount of time to process the funds transfer, but also may jeopardize the security of confidential information associated with the transaction due to the typical need for multiple transmissions of the relevant information. Furthermore, by reducing the participants in the transaction and by enabling the card issuer to facilitate the funds transfer, certain transaction fees and/or costs may be reduced or avoided entirely because the card issuer is positioned to profit from the increased card use, rather than simply profiting from the fees associated with the manner in which the card is used by individual purchasers.

Figure 2:
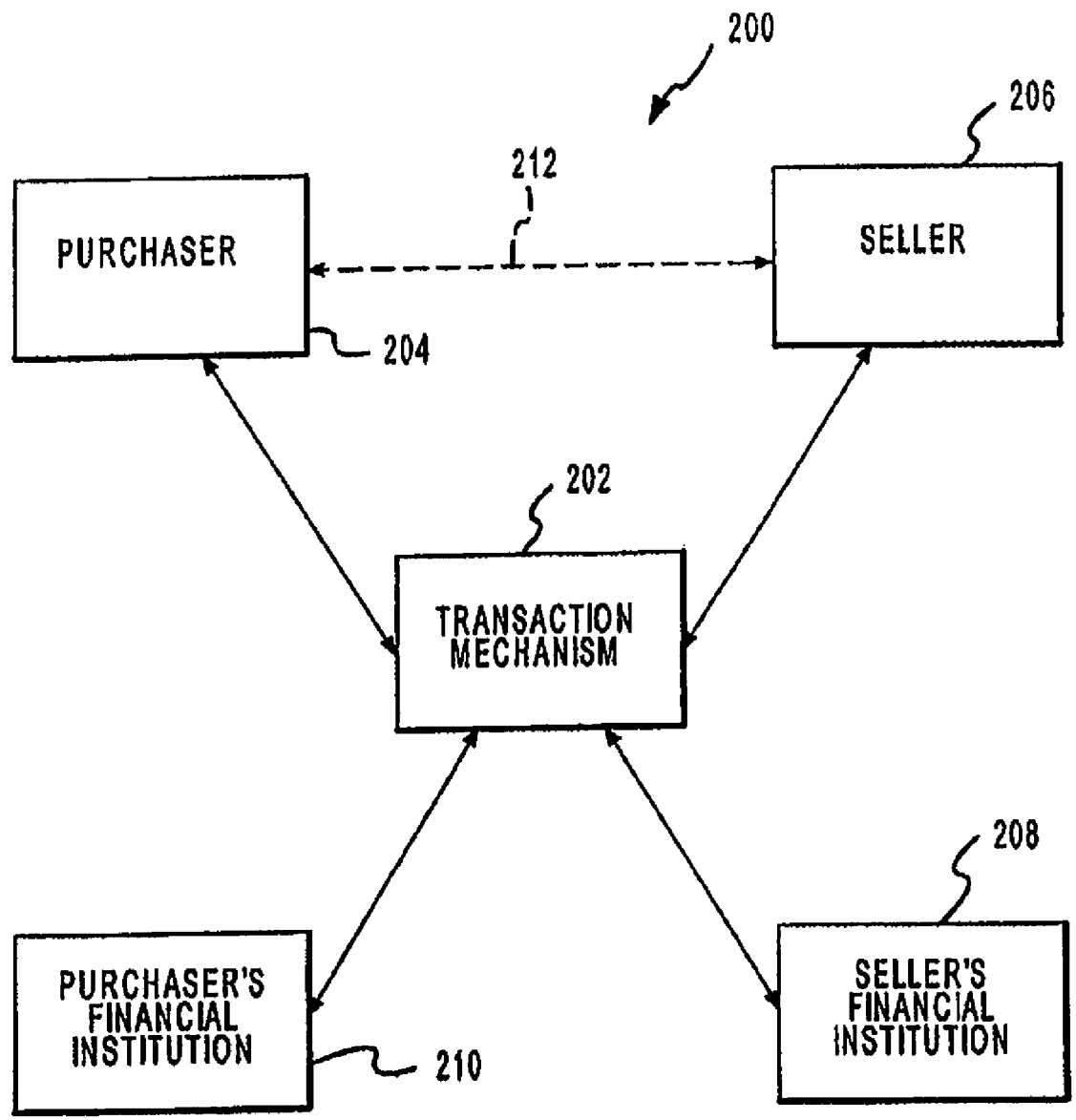
FIGS. 2-4 are schematic block diagrams illustrating exemplary transaction systems in accordance with various aspects of the present invention.

In accordance with an aspect of the present invention, FIG. 2 is a diagram illustrating an exemplary transaction system 200. The transaction system 200 comprises a transaction mechanism or server 202 which facilitates and controls commercial transactions between a purchaser 204 and a seller 206. In order to complete the funds transfer from the financial account of the purchaser 204 to the financial account of the seller 206, the transaction mechanism 202 communicates with at least one of a seller's financial institution 208, which comprises a suitable financial account associated with the seller 206, and a purchaser's financial institution 210, which comprises a suitable financial account associated with the purchaser 204. In the case where the seller's financial account comprises a demand deposit account, for example, the seller's account can include, for example, a bank account, such as a savings, checking, or money market account associated with the seller 206. In an exemplary embodiment, the communication link between the transaction mechanism 202 and the seller's financial institution 208 can comprise a suitable connection to an automated clearinghouse (ACH) for facilitating bank checking account transfers, as is well-known to those in the industry.

In an exemplary embodiment, the purchaser's financial institution 210 may comprise the transaction mechanism 202. In another exemplary embodiment, transaction mechanism 202 is maintained by an independent third party, such as an intermediary 314, as described more fully below with reference to FIG. 3. The communication links between and among the transaction mechanism 202, purchaser 204, seller 206, seller's financial institution 208, and purchaser's financial institution 210 can be implemented through one or more communications networks, such as a private extranet, a public Internet, and/or a third party extranet, though it will be recognized by those skilled in the art that other networks such as a public switch telephone network (PSTN) likewise may be utilized. Moreover, although the present invention may be suitably implemented with TCP/IP protocols, it will be readily appreciated that the invention also can be implemented using IPX, Appletalk, IP-6, NetBIOS, OSI, or any number of other protocols either currently known or hereafter devised. Further, in another exemplary embodiment, purchaser 204 and seller 206 are implemented by any suitable type of personal computer, point of interaction device, network computer, workstation, minicomputer, mainframe, and/or the like, which implementation preferably includes a suitable browser application, such as a World Wide Web (Web) browser, preferably having suitable encryption capability.

In accordance with the present invention, it is preferred that either one or both of the purchaser 204 and seller 206 pre-register with the transaction mechanism 202. However, as those skilled in the art will appreciate, a specific registration of the purchaser 204 and/or the seller 206 is not required and registration may take place at any suitable time, including at the time of the transaction. During purchaser registration, the purchaser 204 preferably provides suitable financial account information, such as card information for example, and suitable purchaser identification information. In an exemplary embodiment, the purchaser identification and/or account information includes any suitable information related to the purchaser and/or the account, such as any one or more of the following: name, address, demographic information, social security number, telephone number, account number, account expiration date, personal identification number associated with the account, date of birth, mother's maiden name, spending habit information, billing history information, credit history information, and/or any additional information which might identify the purchaser and the purchaser's financial account. The purchaser identification information can be used for subsequent purchaser authentication. During seller registration, the seller 206 preferably provides suitable financial account information and suitable identification information relating to an account, such as an appropriate card or demand deposit account for example, at the seller's financial institution 18. The seller's identification information can be used for subsequent authentication. In an exemplary embodiment, one or both of the purchaser 204 and seller 206 are card members or cardholders of the card issuer which is providing the transaction mechanism 202, thereby expediting and streamlining the registration process and, in another exemplary embodiment, subsequent authentication and credit/fraud analysis processes performed by the transaction mechanism 202.

As illustrated in FIG. 2, a transaction 212 may be initiated by one of either the purchaser 204 or the seller 206. The transaction 212, which is illustrated in phantom lines in order to represent that it is optional, may comprise the exchange of goods, services, or other value from the seller 206 to the purchaser 204 in exchange for a transfer of funds from the purchaser's financial account at the purchaser's financial institution 210 to the seller's financial account at seller's financial institution 208. However, it should be appreciated that transaction 212 need not comprise an exchange of goods and/or services, but rather, may comprise a gratuitous transfer of funds from a purchaser 204 to a seller 206. By way of example, the purchaser 204 may be purchasing goods from the seller 206 which goods were identified through a classified ad, an Internet posting, an Internet auction, and/or the like, or, alternatively, the purchaser 204 may be transferring funds to the seller 206 for philanthropic, charitable, or other gift-giving purposes. Thus, depending upon the nature of the transaction 212, one of either the purchaser 204 or the seller 206 will initiate the transfer of funds by suitably providing to the transaction mechanism 202 transaction information. The transaction information may include identification information regarding one or both of the purchaser 204 and the seller 206 as well as the terms of the transaction, which can include suitable account information, the date and time of the transaction, the amount of the funds transfer, a description of the goods, services, or other value, any escrow terms (such as a suitable escrow release event), and/or the like. In addition, requests for value-added services, such as insurance, dispute resolution, postal tracking, and/or the like may be made by one or both of the purchaser 204 and/or the seller 206.

The transaction mechanism 202 then suitably authenticates the seller 206 and/or the purchaser 204 to ensure that they are the appropriate owners of their respective accounts. In an exemplary embodiment, the transaction mechanism 202 is provided by the purchaser's financial institution 210, such as the card issuer of a purchaser's card for example, which financial institution is able to perform suitable risk management functions, such as suitable credit risk and/or fraud risk analyses for example. The ability of the transaction mechanism 202, through a suitable financial institution which preferably maintains and operates the transaction mechanism 202, to perform credit risk and fraud risk analyses is particularly advantageous, since performance of these services by a third party not only delays the transaction process but presents an additional security risk when transmitting and processing confidential or transaction-sensitive information to and from the third party. Moreover, when the transaction mechanism 202 is provided by the purchaser's financial institution 210, such as a card issuer, information such as historical transactional records, account records, and/or the like easily can be reviewed to determine whether a credit or fraud risk exists.

In another exemplary embodiment, the transaction mechanism 202 suitably determines whether the purchaser's financial account has a sufficient balance to enable the funds transfer identified in the transaction information. If the purchaser 204 has sufficient funds available in the financial account, and suitable risk management and authentication processes do not result in a negative determination, the transaction is deemed acceptable. The transaction mechanism 202 then executes the transaction by debiting the purchaser's financial account and crediting a suitable escrow account maintained by the transaction mechanism 202. The funds debited from the purchaser's financial account preferably remain in the escrow account for some predefined period of time. The predefined period of time may be based upon the occurrence of a suitably defined escrow release event, such as any of the following events: receipt by the purchaser of the goods, services, or other value; the lapse of a predetermined period of time within which the purchaser may evaluate the goods, services, or other value and either accept or refuse delivery; and/or any other suitable, predefined event. Preferably, the transaction mechanism 202 withholds the funds from the seller's financial account and suitably maintains the funds in the escrow account pending the occurrence of the escrow release event. Debiting of the escrow account and crediting of the seller's financial account for the amount of the funds transfer occurs once the escrow release event has transpired and the purchaser has not rejected the shipment.

In another exemplary embodiment, the transaction mechanism 202 may be suitably configured to include a transaction fee in the amount debited from the purchaser's financial account, and/or the transaction mechanism 202 may be suitably configured to subtract a transaction fee from the amount credited to the seller's financial account. In an exemplary embodiment, the transfer of funds to the seller's financial account from the escrow account includes suitable communications with an ACH, as will be appreciated by one of ordinary skill in the art.

In an exemplary embodiment, the transaction mechanism 202 provides value-added services which may be requested by the purchaser 204 and/or the seller 206 as a part of the transaction between the parties. Preferably, the value-added services may include insurance, dispute resolution, postal tracking, and/or similar services that potentially enhance the value of the transaction to the purchaser 204 and/or the seller 206. In the event that value-added services are requested by the purchaser 204 as a part of the funds transfer, then the cost of such services is included in the amount of funds debited or deducted from the purchaser's financial account. Likewise, the cost of value-added services requested by the seller 204 are suitably withheld or deducted from the funds credited or added to the seller's financial account.

Figure 3:
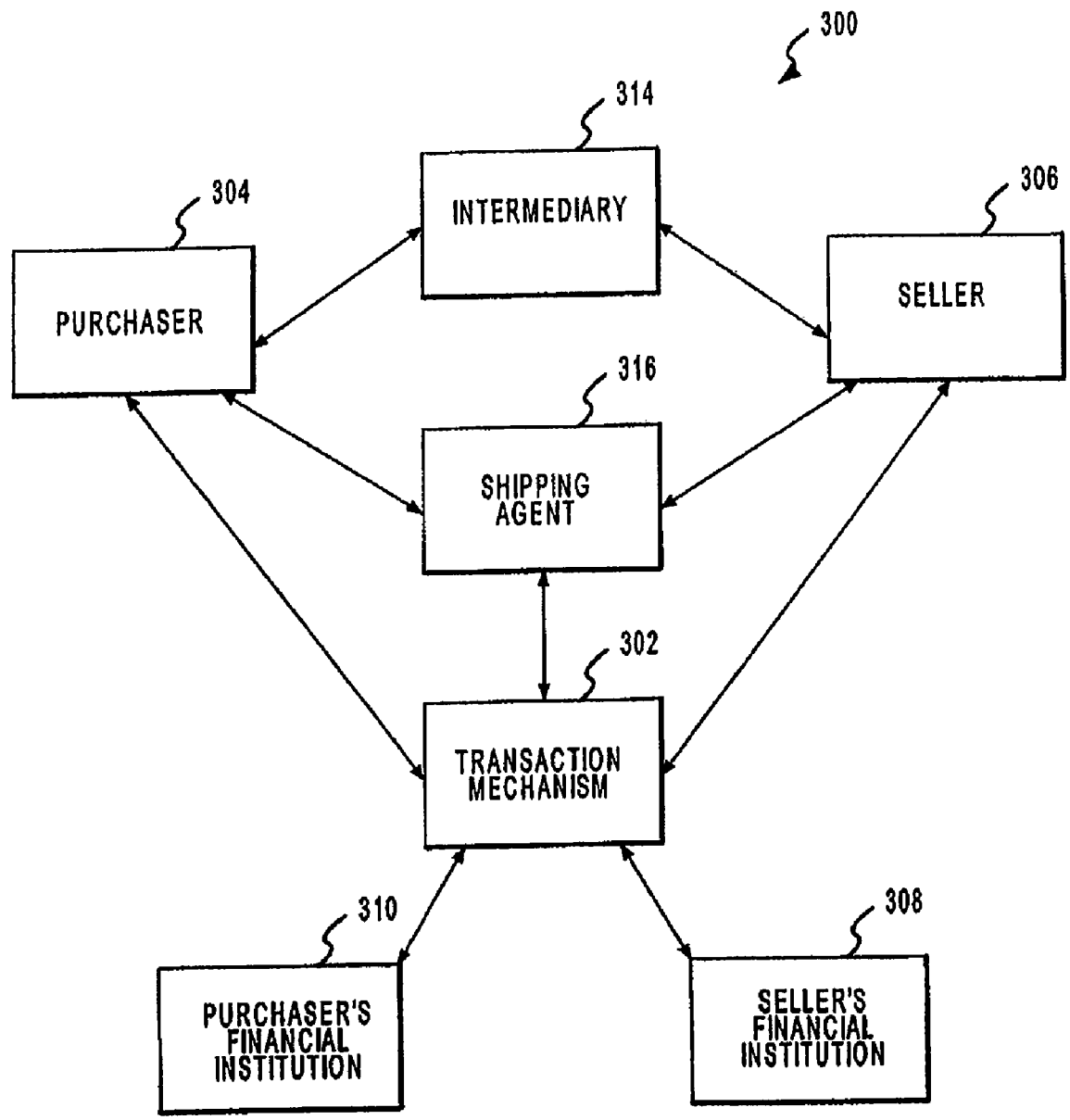

In accordance with another aspect of the present invention, FIG. 3 is a diagram illustrating an exemplary transaction system 300. The transaction system 300 comprises an intermediary 314 which suitably provides an interface between the purchaser 304 and the seller 306. The intermediary 314 can be any suitable third party. In an exemplary embodiment, intermediary 314 can include an online auction such as eBay® or eWanted®, an online merchant such as Amazon.com®, an online classified ad site, and/or the like. By way of example, if the intermediary 314 is eBay, the seller 306 may list goods for sale through the intermediary 314, for which a purchaser 304 may then submit bids. The intermediary 314 then suitably determines whether the purchaser 304 submitted the highest bid and, if so, then makes a final sale determination, which can include sending appropriate notice, such as by e-mail for example, to both the purchaser 304 and the seller 306. Once notified, the purchaser 304 is provided with the opportunity to select means for submitting payment to the seller 306, such as through a suitable card or DDA. For example, by selecting the card payment method, transaction information regarding the sale is transferred by intermediary 314 to a suitable transaction mechanism 302 provided by a suitable financial institution, such as a card issuer As described above with reference to FIG. 2, the seller 306 preferably is pre-registered with the transaction mechanism 302, and the seller's financial account at the seller's financial institution 308 may suitably receive appropriate funds transferred from the purchaser's financial account at the purchaser's financial institution 310. If the purchaser 304 is not pre-registered, purchaser registration may take place at the time of the transaction with the seller 306. As discussed above, the transaction mechanism 302 receives transaction information regarding the sale, authenticates the purchaser 304 and the seller 306, and performs suitable credit and fraud risk management analyses. If the purchaser 304 has sufficient funds available in their financial account and the risk management and authentication processes do not result in a negative determination, then the transaction mechanism 302 deems the transaction acceptable and debits suitable funds from the purchaser's financial account. Preferably, as described above with reference to FIG. 2, a suitable escrow account maintained by the transaction mechanism 302 is credited with the funds transferred from the purchaser's financial account. Upon the occurrence of a suitably pre-defined or pre-identified escrow release event, the escrow account is suitably debited and the seller's financial account is suitably credited with the funds. Again, as described above, any suitable transaction or service fees are preferably included in the amount of funds debited and transferred from the purchaser's financial account and/or deducted from the amount of funds disbursed and credited to the seller's financial account.

As is often the case with an intermediary 314, such as eBay, the transaction between the seller 306 and the purchaser 304 may involve the shipment of goods from the seller 306 to the purchaser 304. Consequently, as typically determined by the particular business rules of the intermediary 314, the goods are shipped by a suitable shipping agent 316 from the seller 306 to the purchaser 304. Preferably, as a part of the escrow service performed by the transaction mechanism 302, a tracking number will be provided by the shipping agent to the transaction mechanism 302. Upon confirmation that the purchaser 304 has received the goods, the transaction mechanism suitably transfers the appropriate funds to the seller's financial account. Preferably, the shipping agent 316 confirms that the purchaser 304 has received the goods. More preferably, the transaction mechanism 302 only releases the funds to the seller 306 upon the suitable occurrence of any predefined escrow release event, such as the lapse of a specified period of time in which the purchaser 304 may evaluate and either accept or reject the goods. In the case that the escrow release event is not satisfied or that the purchaser 304 rejects the goods, the transaction may be suitably reversed or otherwise abandoned. In the event that there is a dispute between a purchaser 304 and a seller 306 regarding a particular transaction, the financial institution that maintains the transaction mechanism 302 may provide the parties with a suitable dispute resolution mechanism, such as access to any suitable system for providing customer service for example.

In an exemplary embodiment, anonymity or portions of anonymity between the purchaser 304 and seller 306 is suitably maintained throughout the transaction between the parties. One skilled in the art will appreciate that any subset of information may remain anonymous. Preferably, the only purchaser information that is transmitted and known to the seller 306 is the purchaser's user identifier. Likewise, it is preferred that the purchaser's knowledge of the seller 306 is limited to the seller's user identifier. In other words, both the purchaser 304 and the seller 306 need not disclose their name, address, financial account information, or any other confidential information to one another in order to effect the transaction. In this embodiment, the purchaser 304 and seller 306 suitably provide their name, address, financial account information, and any other necessary information to the transaction mechanism 302 upon registering with the transaction mechanism 302. In this manner, the shipping agent 316 suitably obtains the relevant purchaser shipping information from the transaction mechanism 302 to obviate any need for a seller 306 to have access to confidential identification information of a purchaser 304.

Figure 4:
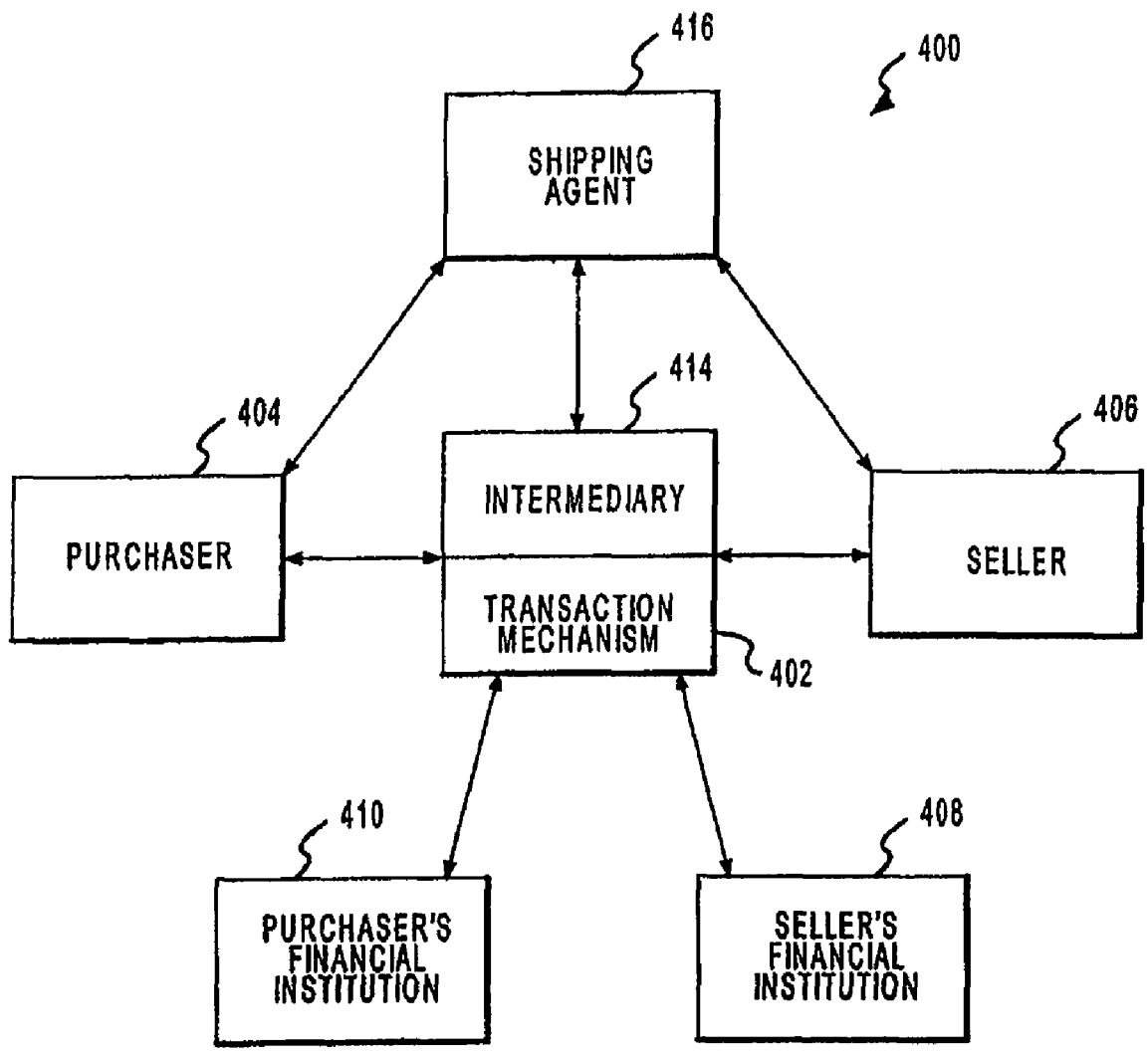

It should be understood that while FIG. 3 illustrates respective communication links between the transaction mechanism 302 and both the purchaser 304 and the seller 306, the scope of the present invention extends to the transmission of information, such as registration information, transaction information, and/or the like, from either or both of the purchaser 304 and/or the seller 306 directly to the intermediary 314 and then from the intermediary 314 to the transaction mechanism 302. In other words, the intermediary 314 may mediate the flow of information from either/both the purchaser 304 and/or the seller 306 to the transaction mechanism 302 without any direct communication between the either the purchaser 304 or the seller 306 and the transaction mechanism 302. Moreover, the intermediary 314 may communicate directly with the transaction mechanism 302 through a suitable communications link or, alternatively, the transaction mechanism 302 may be integrated with the intermediary 314, as illustrated in the exemplary transaction system 400 of FIG. 4. In accordance with this aspect of the present invention, the transaction mechanism 402, which is integrated with the intermediary 414, provides substantially the same functionality as the exemplary transaction mechanisms described above with reference to FIGS. 2 and 3, respectively.

Figure 5:
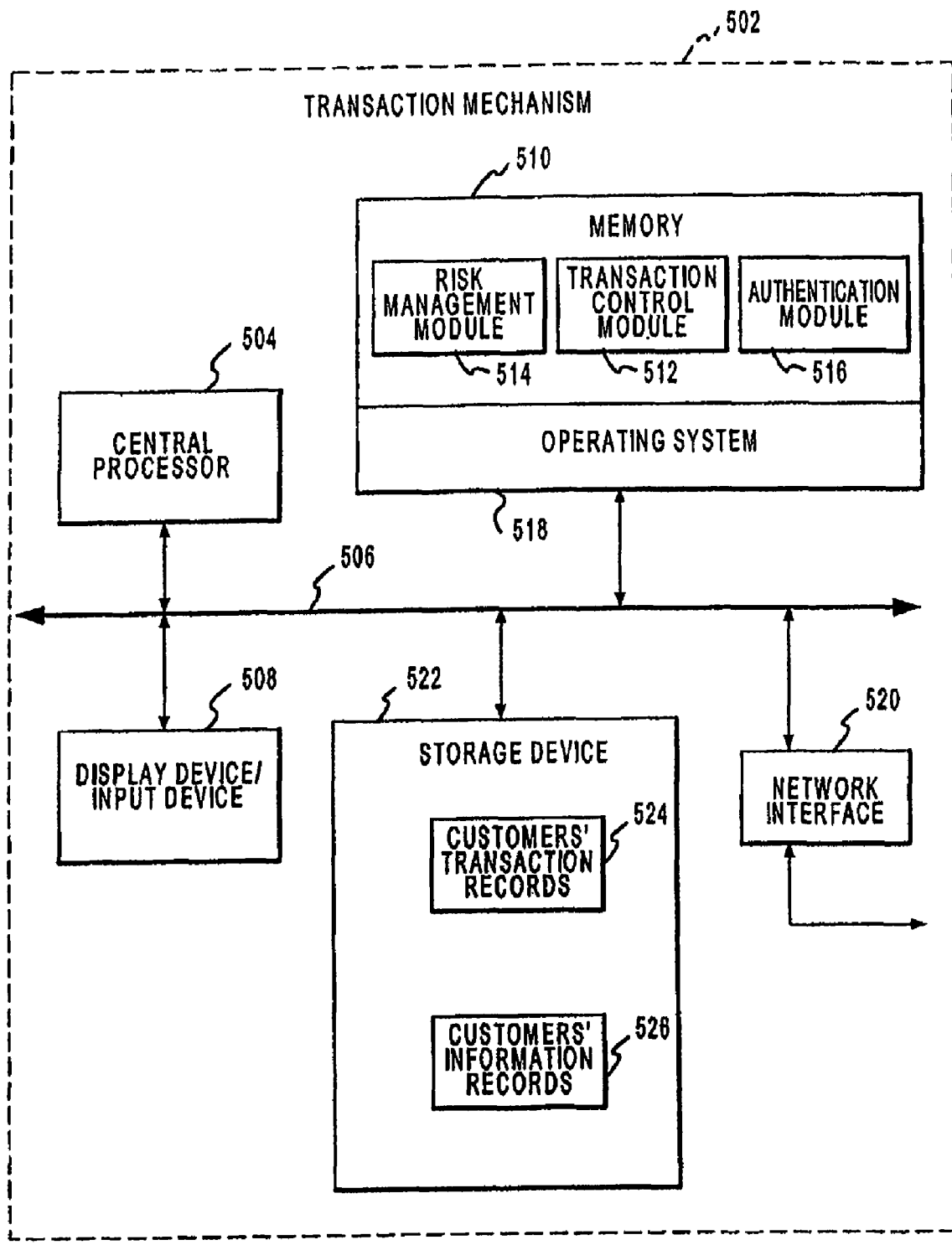
FIG. 5 is a schematic block diagram of an exemplary transaction mechanism in accordance with the present invention.

With reference to FIG. 5, an exemplary transactional mechanism 502 includes a central processor 504 in communication with other elements of the transaction mechanism 502 through a system interface or bus 506. A suitable display device/input device 508, such as a keyboard or pointing device in combination with a monitor, may be provided for receiving data from and outputting data to a user. A memory 510 associated with the transaction mechanism 502 preferably includes a transactional control module 512, a risk management module 514, and an authentication module 516. The memory 510 preferably further includes an operating system 518 which enables execution by processor 504 of the various software applications residing at transaction control module 512, risk management control module 514, and authentication module 516. Operating system 518 may be any suitable operating system, such as any version of Windows, MacOS, BeOS, Linux, UNIX, and/or the like. Preferably, a network interface 520 is provided for suitably interfacing with other elements of the transaction system, such as the elements described above with reference to FIGS. 2-4. Lastly, a storage device 522, such as a hard disk drive for example, preferably contains suitable files which are suitably accessed by the transaction control module 512, the risk management module 514, and the authentication module 516.

In particular, customers' transaction records file 524 preferably comprises transaction information of customers who are registered with the transaction mechanism 502, which transaction information is used to perform suitable credit risk and fraud risk analyses. Likewise, customers' information records 526 comprises information received either from a purchaser or a seller upon registration with the transaction mechanism 502 or during the maintenance of the appropriate financial account. As used herein, a "customer" may be either a purchaser or a seller who has a financial account with the financial institution which suitably maintains the transaction mechanism 502 and who is registered with the transaction mechanism 502. Accordingly, providing the transaction mechanism 502 with access to the appropriate transaction records and information records of the parties involved in the funds transfer facilitates essentially real time risk management by the risk management module 514. Similarly, authentication of the parties to the transaction may likewise be performed efficiently by the authentication module 516, which preferably has access to the records residing in storage device 522. One skilled in the art will appreciate that the storage device 522 and, therefore, customer transaction records 524 and customer information records 526 may be co-located with the transaction mechanism 502, as illustrated in FIG. 5, or may be remotely located with respect to the transaction mechanism 502. If the storage device 522 is remotely located with respect to the transaction mechanism 502, communication between storage device 522 and transaction mechanism 502 may be accomplished by any suitable communication link but is preferably accomplished through a private Intranet or extranet.

Figure 6:
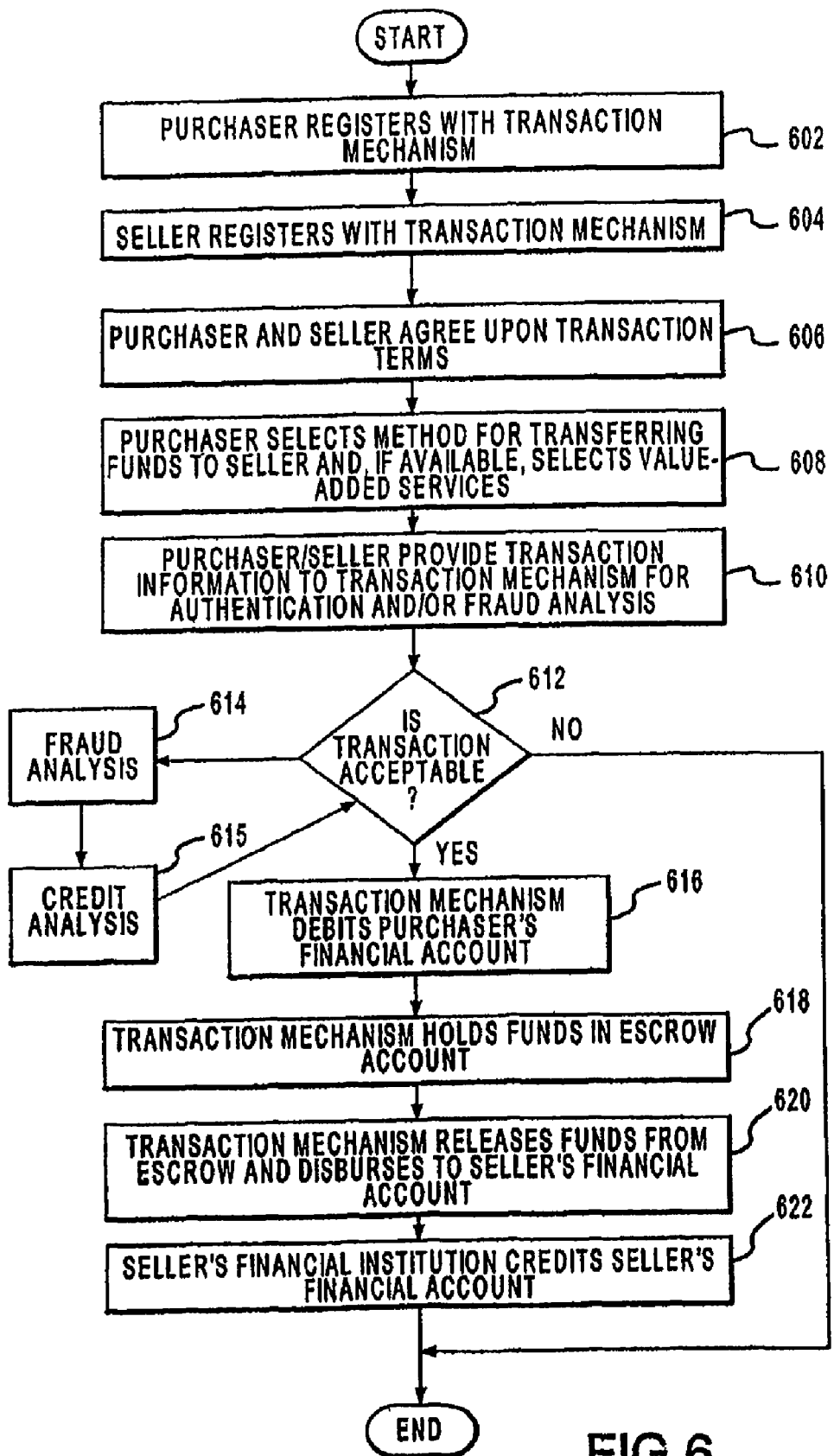
FIG. 6 is a flowchart representing an exemplary commercial transaction in accordance with the present invention.
Figure 7:
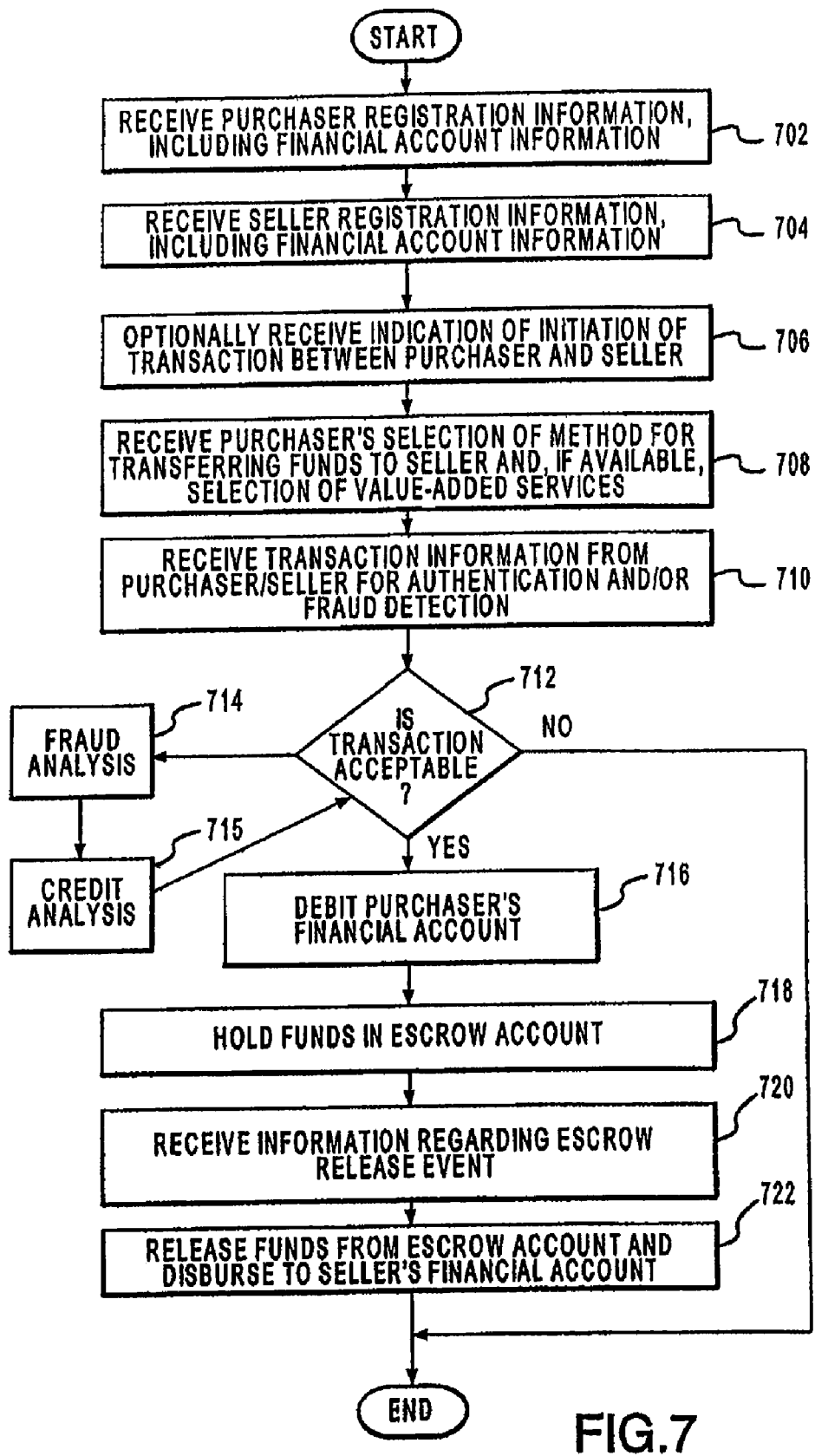
FIG. 7 is a flowchart of an exemplary transactional mechanism in accordance with the present invention.

Referring next to FIGS. 6 and 7, as discussed, the process flows depicted in these figures are exemplary embodiments of the invention only and are not intended to limit the scope of the invention as described above. FIG. 6 is a flow diagram representing an exemplary process for facilitating a commercial transaction between a purchaser and a seller. In accordance with the present invention, an exemplary process executed by a suitable transaction mechanism may include any of the following: registering a purchaser with the transaction mechanism (step 602); registering a seller with the transaction mechanism (step 604); receiving agreed upon transaction terms from at least one of a purchaser and a seller (step 606); receiving a purchaser's selection of a method for transferring monetary value to a seller (step 608); receiving transaction information from at least one of a purchaser and a seller (step 610); performing authentication, credit risk, and/or fraud risk analyses (step 612); determining whether the transaction is acceptable (step 614); terminating the transaction if the transaction is not acceptable; debiting funds from a purchaser's financial account if the transaction is acceptable (step 616); holding the funds in an escrow account (step 618); releasing the funds from the escrow account and disbursing the funds to the seller's financial account (step 620); and crediting the funds to a seller's financial account (step 622).

In accordance with the present invention, any purchaser having a financial account can transfer funds from the purchaser's financial account to the financial account of a second party. For example, a purchaser having a card can transfer funds from the purchaser's card to the card or demand deposit account of any second party having such an account. As represented in FIG. 6 by step 602, the purchaser preferably pre-registers with a transaction mechanism, which transaction mechanism can be established and maintained by any suitable third party, such as a card issuer, as described above with reference to FIGS. 2 and 3. To register with the transaction mechanism, the purchaser may submit suitable purchaser registration information, such as information establishing the identity of the purchaser and information regarding the purchaser's financial account. The purchaser registration information can be suitably stored by the transaction mechanism, such as by storage device 522 of FIG. 5. The purchaser may communicate with the transaction mechanism by any means of communication known to those skilled in the art, including communications by telephone or through the use of any form of computer or point of interaction device having a means for communication, such as a modem, suitable wireless means for communication, and/or the like. If the transaction mechanism is maintained by the purchaser's financial institution, the purchaser can suitably register with the transaction mechanism at the same time that the purchaser initially completes the application for the financial account. Alternatively, the purchaser can register with the transaction mechanism at any suitable time, including at the time of a transaction with a seller.

The purchaser registration information which may be used by the transaction mechanism can include any suitable information, such as any of the types of information described above with reference to FIG. 2. Upon submission of such information to the transaction mechanism, the transaction mechanism may then issue to the purchaser a unique user identifier, such as an identification number, code, password, pass phrase, and/or other suitable identifier which may be used by the transaction mechanism to identify the purchaser. In this manner, the purchaser's user identifier can be used by the transaction mechanism to identify and suitably access the purchaser's registration information at the time of a transaction between a purchaser and a seller. The user identifier can comprise any number or combination of letters, digits, or other characters. If the transaction mechanism is accessible through the Internet, and especially if the purchaser registers with the transaction mechanism through an interface at an Internet Web page, the transaction mechanism or entity maintaining the transaction mechanism can e-mail the appropriate user identifier to the purchaser, optionally using any well-known means for secure communications, such as suitable encryption.

As indicated at step 604, the seller preferably also registers with the transaction mechanism. Although FIG. 6 illustrates the registration of a seller with the transaction mechanism subsequent to the purchaser's registration, the seller can register with the transaction mechanism at any suitable time, including prior to the purchaser's registration and at the time of the transaction with the purchaser. As with the purchaser, the seller preferably provides the transaction mechanism with registration information to identify the seller and to identify the seller's appropriate financial account, such as a card or a demand deposit account, to which the transaction mechanism may transfer funds. The seller's registration information may include any suitable information, such as the seller's name, location or address, social security number (if appropriate), federal employer identification number, financial account number, financial institution, and/or any other suitable information that may be pertinent to a funds transfer transaction. If the seller is associated with the financial institution that is providing the transaction mechanism, the seller's registration information can be suitably stored by the storage device shown in FIG. 5. Furthermore, as with the purchaser, the seller suitably receives from the transaction mechanism a user identifier which identifies the seller to the transaction mechanism. After the purchaser and seller are registered with the transaction mechanism, as illustrated in steps 602 and 604, the purchaser and seller can suitably agree upon the terms of a transaction, as shown in step 606.

The transaction illustrated in step 606 may be an exchange of goods or services for value, although this is not required. The transaction, for example, could include a transaction where the purchaser is gratuitously transferring funds from the purchaser's financial account to the financial account of the seller, thereby eliminating the need for a reciprocal exchange. The purchaser and seller may enter into the transaction through the Internet, such as where a purchaser seeks to purchase goods, services, or other value from an Internet Web site operated by the seller for example. Alternatively, the purchaser and seller can agree to enter into the transaction in a more conventional manner, such as through person-to-person communication over the telephone or in person for example. The particular terms of the transaction between the purchaser and the seller may include any suitable terms that are agreeable to the parties and may address issues such as the nature of any goods, services, or other value; the amount of the funds that are to be transferred from the purchaser's financial account to the seller's financial account; the nature and definition of any escrow release event; the anticipated date or window for delivery or shipment of any goods, services, or other value; and/or other suitable terms and conditions pertaining to the transaction.

After the purchaser and seller have agreed upon the terms of the transaction, the purchaser may be requested to select a method for transferring suitable funds to the seller, as indicated in step 608. The selection of a method for transferring the necessary funds may be completed through the transaction mechanism or, alternatively, through any other suitable means and then suitably communicated to the transaction mechanism. For instance, where the purchaser is purchasing goods, services, or other value from an online seller via an Internet Web site, the Web site, rather then the transaction mechanism, can request that the purchaser select a method of transferring monetary value to the seller. After the purchaser suitably responds to the query, such as through a pop-up display generated by the Internet site, the purchaser's response may be suitably communicated to the transaction mechanism. Alternatively, the purchaser can select a funds transfer method directly through the transaction mechanism, which may occur in the case where the particular Internet site does not request such information but, rather, allows the transaction mechanism to issue the relevant query. Additionally, the latter circumstance may occur in the case where a purchaser is transacting with a seller through a site which maintains the transaction mechanism, such as an online sales site maintained by a card issuer.

In addition to selecting a method for transferring funds to a seller, such as through a card or DDA transaction, the purchaser may also select one or more value-added services, as indicated in step 608. For example, where the transaction mechanism is maintained by a card issuer, the purchaser may be able to select value-added services provided by the card issuer, such as purchaser's insurance, shipping alternatives (where the purchaser has purchased goods or, alternatively, services which may be embodied in documents of any suitable type), postal tracking alternatives, dispute resolution to mediate any dispute that may arise between the purchaser and seller regarding the transaction, and/or the like. It will be appreciated by those of skill in the art that additional value-added services may be offered by the seller in addition to those offered by the third party entity maintaining the transaction mechanism.

After selecting a funds transfer method and any value-added services, the purchaser and/or seller may provide suitable transaction information to the transaction mechanism for authentication, credit risk analysis, and/or fraud risk analysis, as represented in step 610. The transaction information can include, but is not limited to, the amount of funds to be transferred between the purchaser and seller, the date and time of the transaction, a description of the transaction, the purchaser's and seller's respective unique user identifiers, and any other pertinent information which may suitably identify the transaction as well as both the purchaser and the seller. For example, the transaction information can include a date and time at which the transfer of funds should take place. In this manner, the purchaser and seller can indicate that the transfer of funds can take place at a specific time in the future. Upon receiving the transaction information, the transaction mechanism can look-up and access the customer information records, which preferably include at least one of the purchaser's and the seller's registration and financial account information. As discussed above, this information preferably includes data such as the purchaser's financial account identifier and/or the seller's financial account identifier, as well as any additional information that has been suitably input in steps 602 and 604, above.

Thereafter, as represented by step 612, the transaction mechanism may suitably determine whether the transaction is acceptable. In an exemplary embodiment, one component of this determination utilizes the transaction information and the purchaser and/or seller registration information to execute a fraud analysis, as represented by step 614. For example, where the transaction mechanism is established and maintained by a card issuer and the purchaser is a cardholder of a card issued by the card issuer, the card issuer can maintain a history of the purchaser's card transactions. Such card transaction history can be suitably stored along with the purchaser registration information in the customer information records or the customer transaction records, as described above. Using this historical information, the risk management module of the transaction mechanism can perform a fraud analysis by executing a fraud detection program or mechanism to determine whether the current transaction, or current transaction in view of recent transactions, is indicative of fraud. For example, where a card has been utilized to purchase multiple high-priced items, the fraud analysis may flag the transaction such that the transaction mechanism will terminate or otherwise not permit the purchaser to complete the transaction. The fraud detection mechanism may suitably end the transaction, as represented by the negative outcome of step 612, or, alternatively, may query the purchaser to determine whether the purchaser is actually the proper cardholder. In the case of terminating the transaction without presenting further queries to the purchaser, the purchaser and/or the seller may be contacted through any suitable means, such as a real time display, e-mail, telephone, and/or the like, to notify the purchaser and/or the seller that the transaction was not completed.

The transaction mechanism's determination regarding the acceptability of the transaction may suitably include a second component, namely a credit analysis, as represented by step 615, which effects a comparison of the user identifiers of either/both the purchaser and the seller with the user identifiers stored in the storage device to determine whether the transaction is acceptable. After suitably identifying the accounts of the parties entering into the transaction, the transaction mechanism may suitably analyze whether the transaction is acceptable based upon additional criteria. The analysis for determining transaction acceptability can be suitably implemented through a computer-readable storage medium encoded with processing instructions, as described above. Such analysis can include a determination of whether the purchaser has sufficient credit or funds in the financial account to complete the transaction. Additionally, in the event that the purchaser uses a card to accomplish the funds transfer to the seller, the transaction mechanism may suitably terminate the transaction if it determines that the purchaser's card has expired, has been reported as lost or stolen, or is otherwise invalid. Where the transaction mechanism determines, through a program or any other suitable means, that the transaction cannot be completed properly, the transaction mechanism will not complete the transaction, as seen in the negative outcome of step 612. When a negative outcome occurs, the purchaser and/or the seller may be contacted through any suitable means, such as a real time display, e-mail, telephone, and/or the like, to notify the purchaser and/or the seller that the transaction was not completed and to provide particular reasons for the termination of the transaction.

Once a transaction is deemed to be acceptable, the transaction mechanism suitably completes the transaction by debiting the purchaser's financial account, as represented by step 616. Preferably, the transaction mechanism then transfers the funds to a suitable escrow account and holds the funds in the escrow account until a suitable escrow release event has transpired, as represented by step 618. Once the escrow release event has transpired, the funds are then released from the escrow account and disbursed to the seller's financial account, as represented by step 620. In accordance with the terms of the transaction as agreed to by the purchaser and the seller, the funds then are disbursed to the seller's financial account and the seller's account is suitably credited with the funds, as represented by step 622. The transaction mechanism may automatically include any suitable transaction fees, as a service charge for the transaction, in the funds debited from the purchaser's financial account and/or may automatically deduct such fees from the funds disbursed to the seller's financial account.

FIG. 7 is a flow diagram of the operation of an exemplary transaction mechanism in accordance with the present invention. As described above with reference to FIG. 6, the transaction mechanism preferably first receives registration information from the purchaser and the seller, as indicated by steps 702 and 704. Registration information may be entered by a purchaser and/or a seller using any well-known input device, such as a keyboard or mouse suitably connected to any type of computer which can suitably communicate with the transaction mechanism. The registration information may then be transmitted to the transaction mechanism either in real time or downloaded to the transaction mechanism after the registration information is input by the purchaser and/or the seller.

Optionally, as is shown in step 706, the transaction mechanism may receive an indication that a transaction between a purchaser and a seller has been initiated. This indication may originate from either the purchaser or the seller or, alternatively, from an intermediary, which may be unrelated to the entity which maintains the transaction mechanism. For example, a purchaser may choose to transfer funds using an interface located at an intermediary's Web site. This type of funds transfer might occur after the intermediary has suitably queried the purchaser as to the purchaser's preferred funds transfer method, such as by issuing a query by using any of several conventional graphical interfaces or pop-up graphics that are well-known in the art. Alternatively, the seller may suitably initiate the transaction.

Thereafter, as represented by step 708, the transaction mechanism receives suitable information regarding the purchaser's selected method for transferring funds to the seller, such as by a card or DDA for example, and any selected value-added services, as described above. This step may be facilitated by any suitable mechanism, such as a suitable network connection, such as an Internet connection, or through any suitable input device associated with the transaction mechanism. Preferably, at least one of the purchaser and the seller provides suitable transaction information to the transaction mechanism for authentication, credit risk, and fraud risk analyses. Once the transaction mechanism receives suitable transaction information, as represented by step 710 and as described in greater detail above, the transaction mechanism suitably determines whether the transaction is acceptable, as represented by step 712. The fraud detection mechanism executed by the risk management module of the transaction mechanism then suitably communicates with the customer transaction records and customer information records to determine whether the transaction represents a potential fraud risk, as represented by step 714 and as described in greater detail above with reference to FIG. 6.

After the fraud detection mechanism has been executed, the transaction mechanism may then suitably perform a credit analysis, as represented by step 715, to compare the user identifiers of either/both the purchaser and the seller to the user identifiers stored in the storage device in an additional effort to determine whether the transaction is acceptable. As described above with reference to FIG. 6, after suitably identifying the accounts of the parties entering into the transaction, the transaction mechanism also may suitably determine whether the purchaser has sufficient credit or funds in the financial account to complete the transaction. Additionally, in the case that the purchaser uses a card to effect the funds transfer to the seller, the analysis can further include a determination of whether the card has expired, has been reported as lost or stolen, or is otherwise invalid. Where the transaction mechanism determines, through a program or any other suitable means, that the transaction cannot be completed properly, the transaction mechanism will not complete the transaction, as seen in the negative outcome of step 712. When a negative outcome occurs, the purchaser and/or seller may be contacted through any suitable means, such as a real time display, e-mail, telephone, and/or the like, to notify the purchaser and/or the seller that the transaction was not completed and to provide particular reasons for the termination of the transaction.

Once the transaction is deemed acceptable, the transaction mechanism completes the transaction by debiting the purchaser's account, as represented by step 716. Preferably, the transaction mechanism then transfers the funds to a suitable escrow account and holds the funds in the escrow account until a suitable escrow release event has transpired, as represented by step 718. Once the transaction mechanism receives information indicating that the escrow release event has transpired, as represented in step 720, the funds are then released from the escrow account and disbursed to the seller's financial account, as represented by step 722. The transaction mechanism also may automatically account for any suitable transaction fees, as a service charge for the transaction, by suitably including any such fees in the funds debited from the purchaser's financial account and/or by suitably deducting any such frees from the funds disbursed to the seller's financial account.

Figure 8:
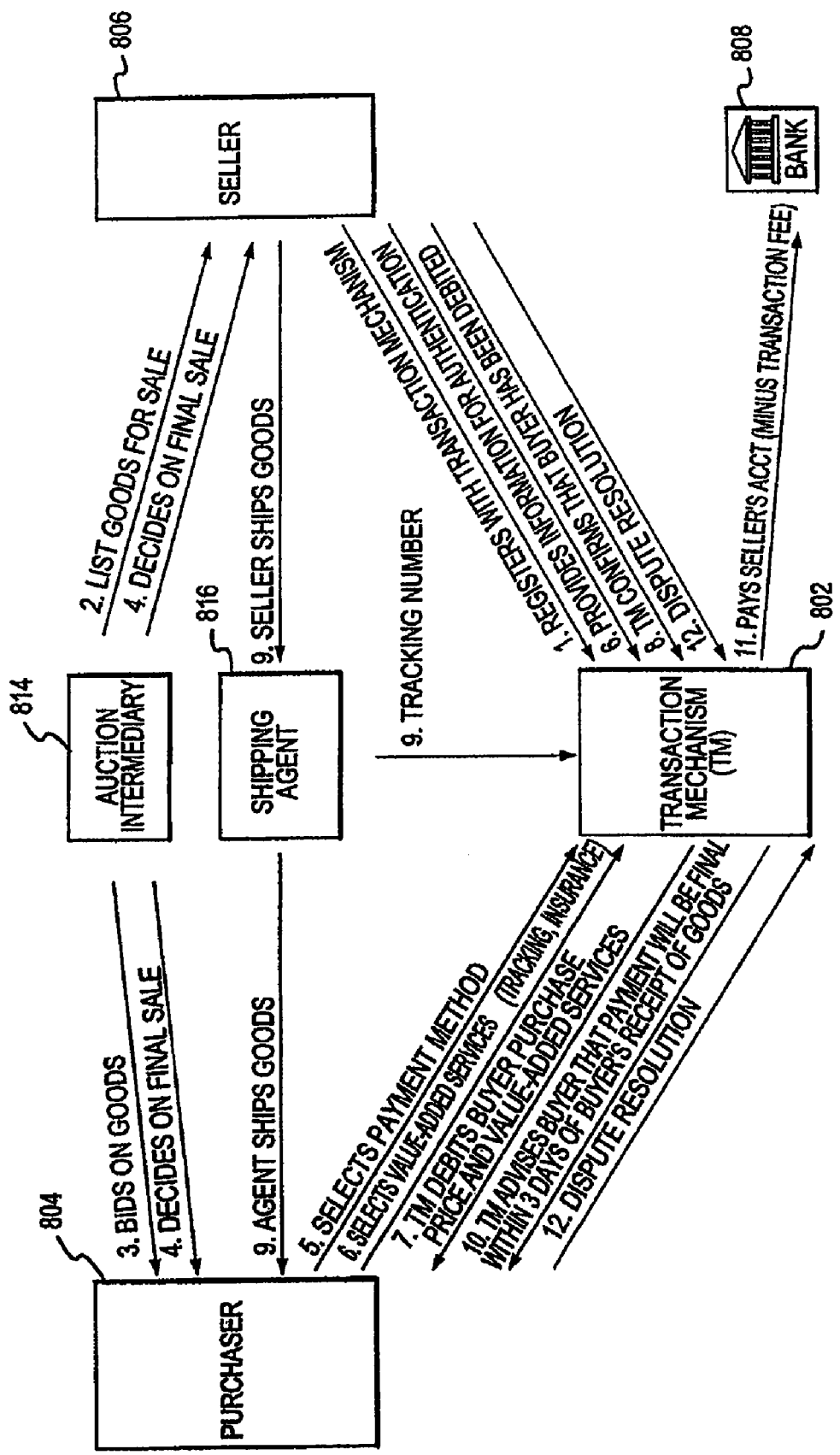
FIG. 8 is a schematic block diagram of the process flow for an exemplary transaction system in accordance with the present invention.

Referring now to FIG. 8, another exemplary embodiment of the present invention includes an auction intermediary 814, such as eBay, and a shipping service 816, such as Federal Express®, United Parcel Service®, and/or any other suitable shipping service. In this embodiment, the seller 806 and/or the purchaser 804 initially register with the transaction mechanism 802. Preferably, the seller 806 lists goods for sale at the Web portal provided by the auction intermediary 814, which listing results in a bid on the goods submitted by a purchaser. The auction intermediary 814 then determines who has submitted the highest bid and notifies both the high-bidding purchaser and the seller. The purchaser 804 then selects a method for transferring suitable funds to the seller, such as by a suitable transaction card or DDA. At the time of the transaction, the purchaser may also be presented with the option of selecting one or more value-added services. The purchaser transaction information is then suitably transmitted to the transaction mechanism 802. Likewise, the seller suitably provides the transaction mechanism 802 with suitable seller information for authentication purposes. The transaction mechanism 802 then performs suitable risk management analysis to determine whether the proposed transaction is associated with any credit and/or fraud risks. If the purchaser 804 has sufficient funds available to complete the transfer and if both the purchaser 804 and the seller 806 are authenticated (and assuming that the credit and fraud risk analyses do not result in a negative determination), then the transaction mechanism 802 suitably debits the purchaser's card or DDA by the amount of the purchase price as well as the cost of any selected value added services. The transaction mechanism 802 then sends a confirmation to the seller 806 that the purchaser's account has been debited. Preferably, the transaction amount then is suitably held in an escrow account maintained by the transaction mechanism, and once the shipping service 816 acquires the goods from the seller for shipment to the purchaser, the transaction mechanism 802 receives a tracking number from the shipping service 816. Depending upon the nature of the escrow, the transfer of funds to the seller's card or DDA will be delayed accordingly. For example, the escrow may be based upon a 3-day waiting period following notification to the transaction mechanism 802 of the receipt of the goods by the purchaser 804, which notification may be received directly from the purchaser 804 or from the shipping service 816. Accordingly, the transaction mechanism 802 disburses the appropriate funds to the seller's DDA (minus any transactional fee) at the seller's bank, which suitably credits the funds to the seller's financial account. If selected by either the purchaser or the seller, value-added services, such as purchaser's insurance and dispute resolution, may be provided as needed. The systems and methods for dispute resolution may include, for example, U.S. Pat. No. 7,249,113 issued on Jul. 24, 2007 "System And Method For Facilitating The Handling Of A Dispute," which is hereby incorporated by reference in its entirety.

As will be appreciated by one skilled in the art, the present invention admits of various aspects which may be implemented in any of several ways. FIGS. 9-20 illustrate the flow of an exemplary transaction implemented in accordance with particular aspects of the present invention. However, it should be understood that this transaction flow is exemplary only and is not intended to limit the scope of the present invention as described above.

Figure 9:
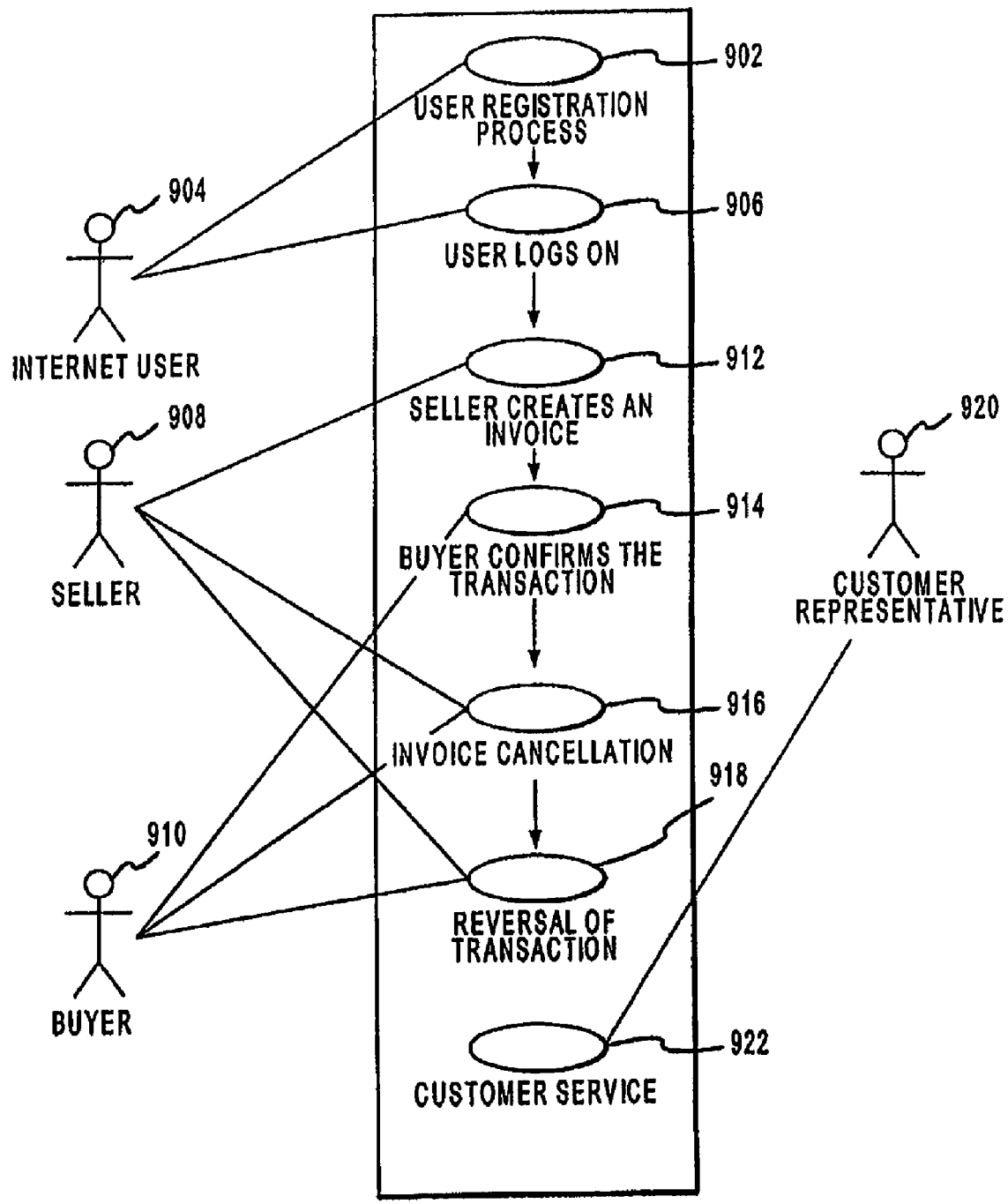
FIG. 9 is a schematic relational diagram associating exemplary actors and exemplary transaction processes in accordance with the present invention.
Figure 10:
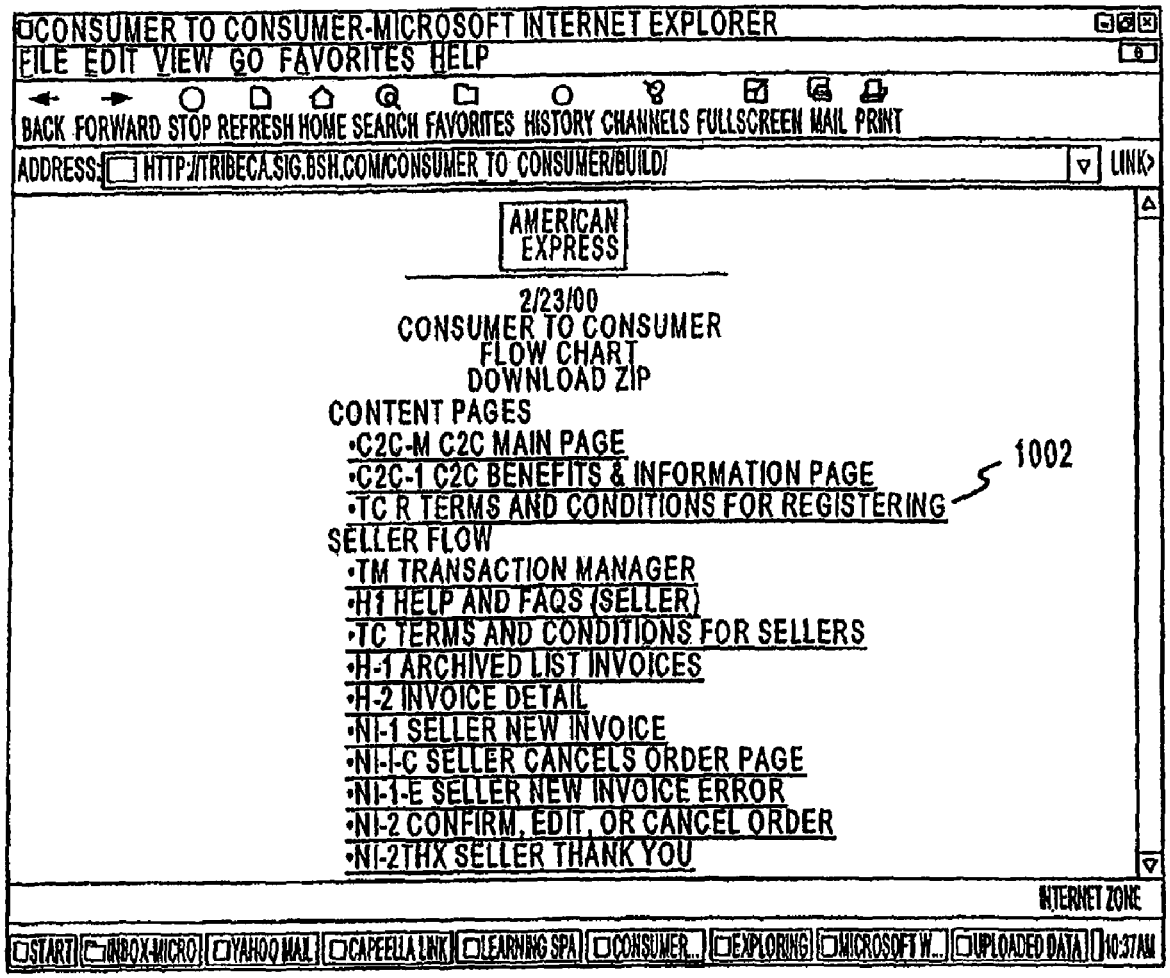
FIG. 10 is an exemplary interface for facilitating user registration with the transaction mechanism.
Figure 11:
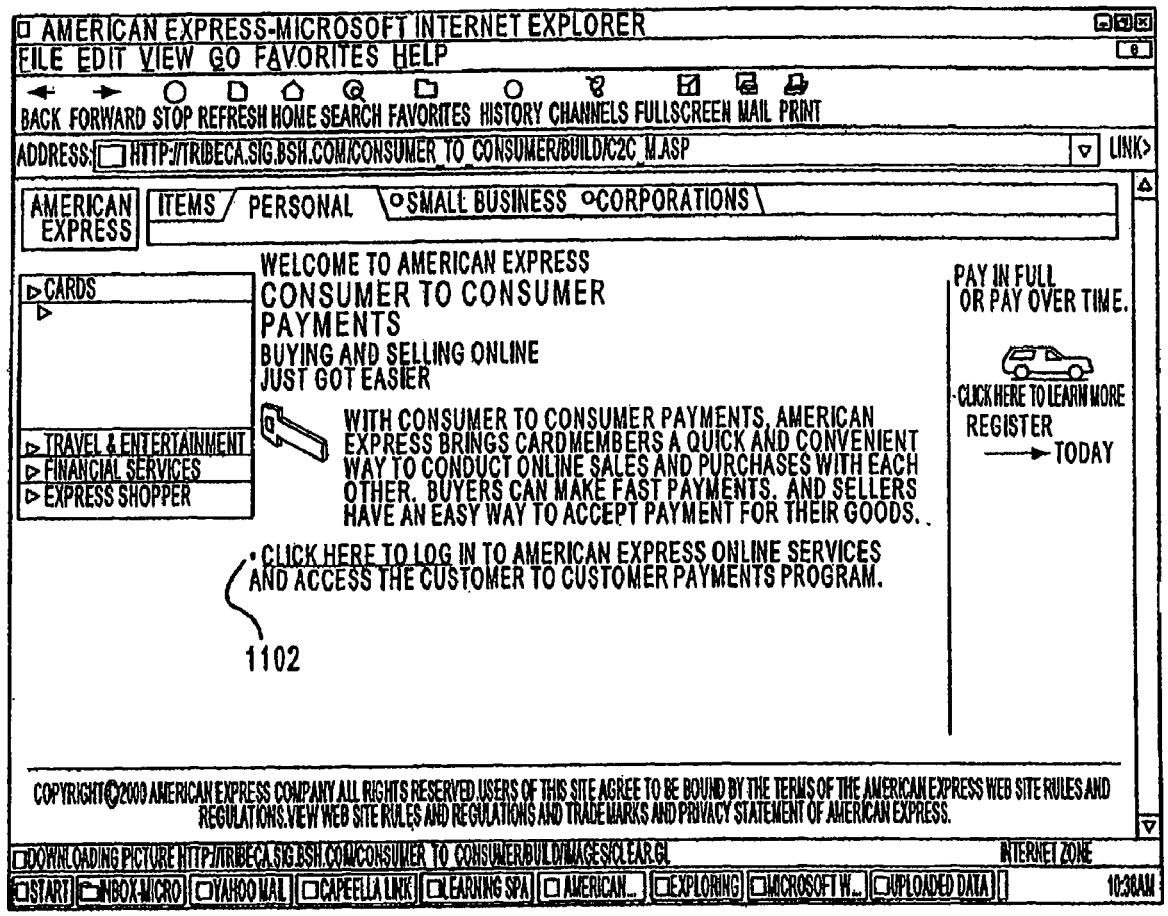
FIG. 11 is an exemplary interface for facilitating user login with the transaction mechanism.
Figure 12:
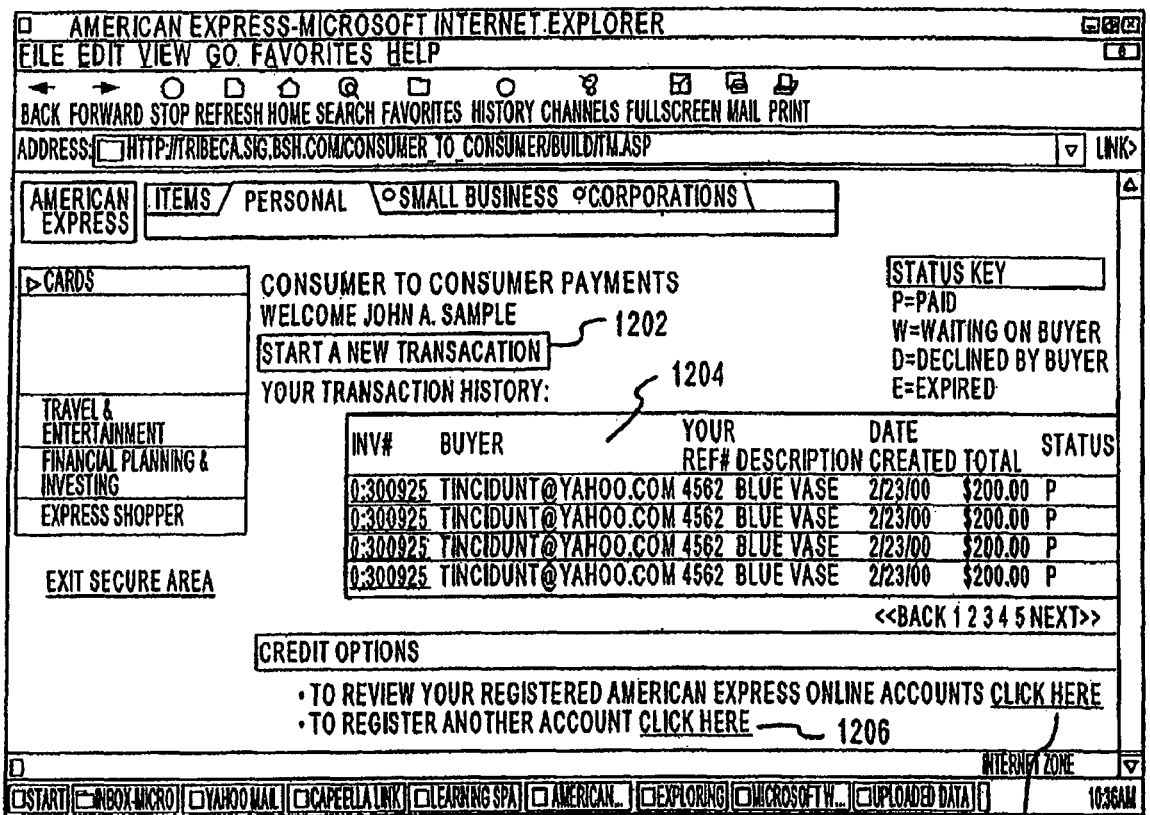
FIG. 12 is an exemplary interface for facilitating transaction initiation.

With reference to FIG. 9, an exemplary user registration process 902 begins when an individual 904, such as an Internet user, accesses the transaction mechanism and requests registration with the transaction mechanism. Internet user 904 may be either a potential purchaser or a potential seller. As illustrated in the exemplary interface of FIG. 10, an Internet user may suitably register with the transaction mechanism by activating hyperlink 1002, which activation preferably results in the display of the terms and conditions for registration and a request that an Internet user input suitable registration information, as described in greater detail above.

Once an Internet user 904 has registered with the transaction mechanism, the Internet user 904 may then suitably request to be logged into the transaction system, as represented by step 906 of FIG. 9. As illustrated in the exemplary transaction mechanism main page of FIG. 11, an Internet user may suitably request the login page by activating hyperlink 1102, which activation preferably results in the display of a login page having suitable datafields. The datafields may request any suitable login information from an Internet user. Such login information may include, for example, a request for the Internet user's unique user identifier and a password or pass phrase. Once the Internet user submits the requested information, the Internet user is suitably logged into the transaction system. If the Internet user submits an invalid user identifier and/or password, an error message is suitably displayed, and the Internet user is requested to re-enter and re-submit the information. Once the Internet user is logged into the transaction system, the transaction system retrieves the list of registered card and DDA accounts held by the Internet user and displays a suitable interface, such as the exemplary interface of FIG. 12, which may provide any suitable means for either conveying information to or receiving information from the Internet user. As illustrated in the exemplary embodiment represented in FIG. 12, the transaction system preferably provides means for initiating a transaction, such as tab 1202 for example, and may suitably display the Internet user's transaction history, as represented by data table 1204. Suitable data access options, such as hyperlinks 1206 and 1208, may be provided to enable the Internet user to access any suitable information that may be provided by the transaction system, such as information pertaining to other registered financial accounts and/or means for registering additional financial accounts with the transaction mechanism.

With momentary reference to FIG. 9, in an exemplary embodiment, Internet user 904 may be either a seller 908 or a purchaser 910. If Internet user 904 is a seller 908 who is suitably registered and logged into the transaction system, the seller 908 may suitably initiate a transaction through the transaction mechanism. In an exemplary embodiment, there are preferably two aspects involved in a seller-initiated transaction. First, the seller 908 suitably creates a transaction invoice, as represented by step 912. Then, the purchaser 910 preferably confirms or accepts the transaction, as represented by step 914. Preferably, at any given point during the transaction, either the seller 908 or the purchaser 910 may either cancel (step 916) or reverse (step 918) the transaction. In the event that a purchaser 910 or a seller 908 experiences any difficulty with the transaction mechanism or if there is, a dispute between the seller 908 and the purchaser 910, a customer service representative 920 associated with the third party entity which is providing the transaction mechanism may suitably provide any desired customer service and/or dispute resolution (step 922).

Figure 13:
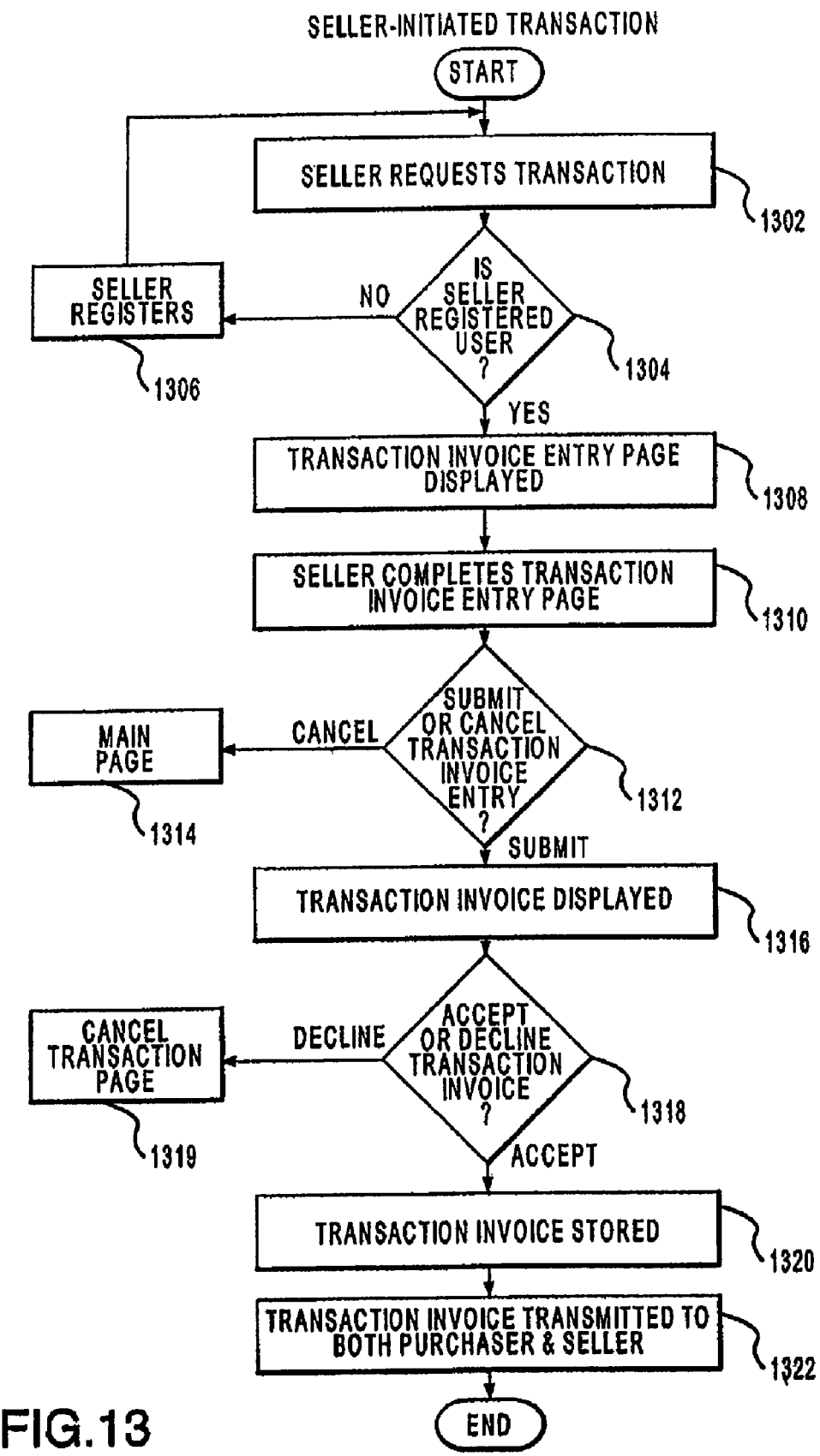
FIG. 13 is a flowchart representing an exemplary seller-initiated transaction.
Figure 14:
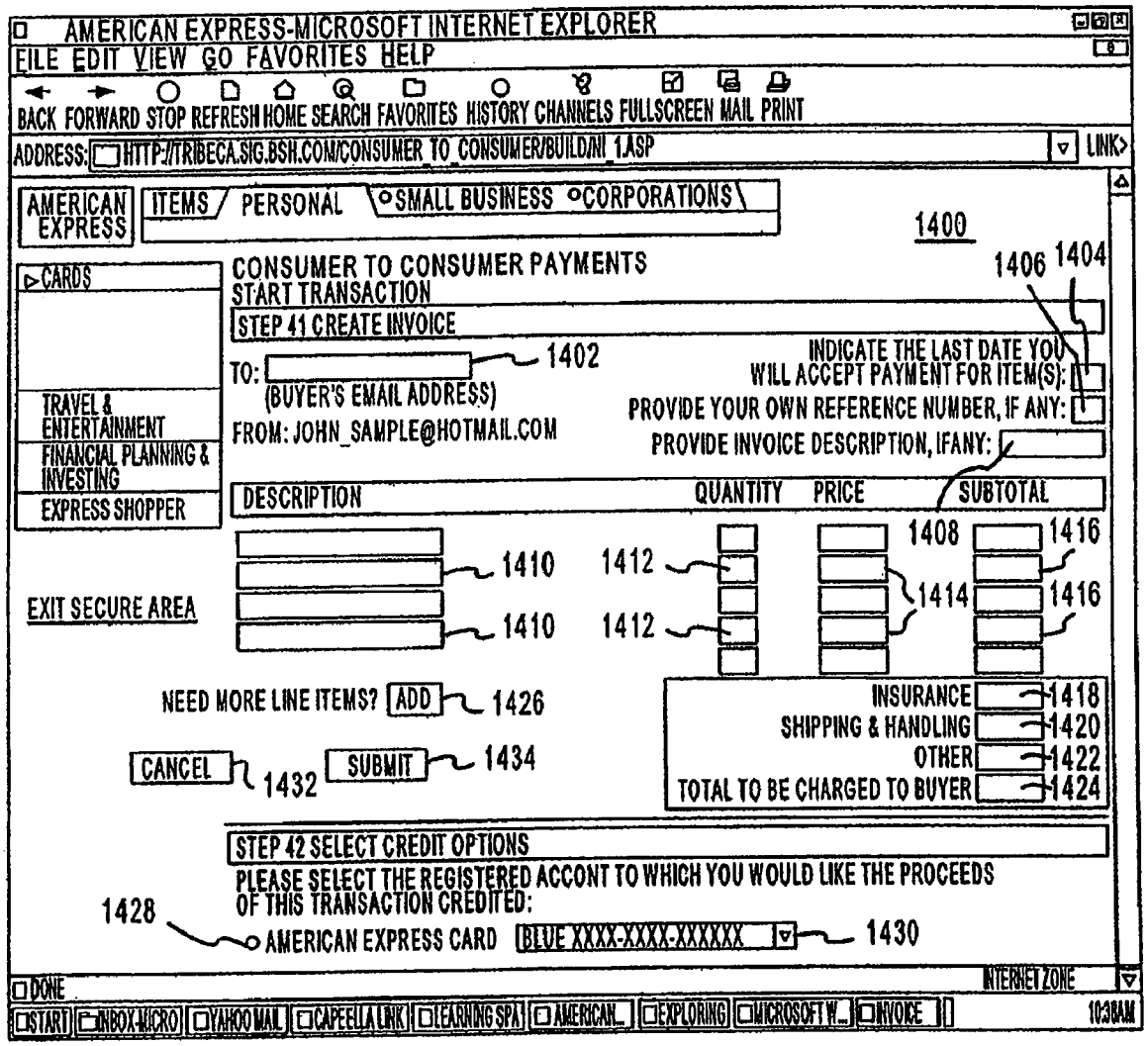
FIG. 14 is an exemplary interface for facilitating the entry of transaction information by a user.
Figure 15:
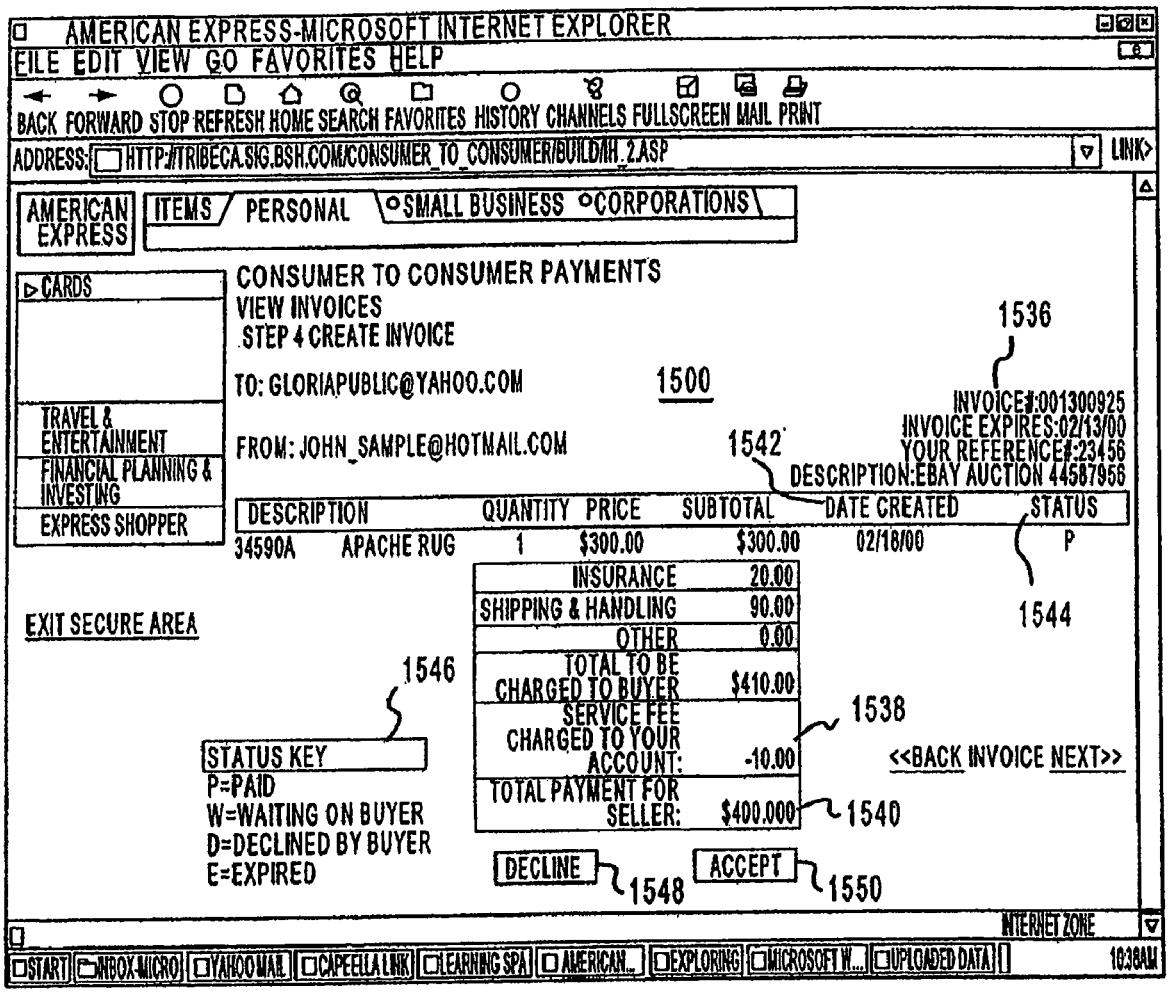
FIG. 15 is an exemplary interface depicting an exemplary transaction invoice.
Figure 16:
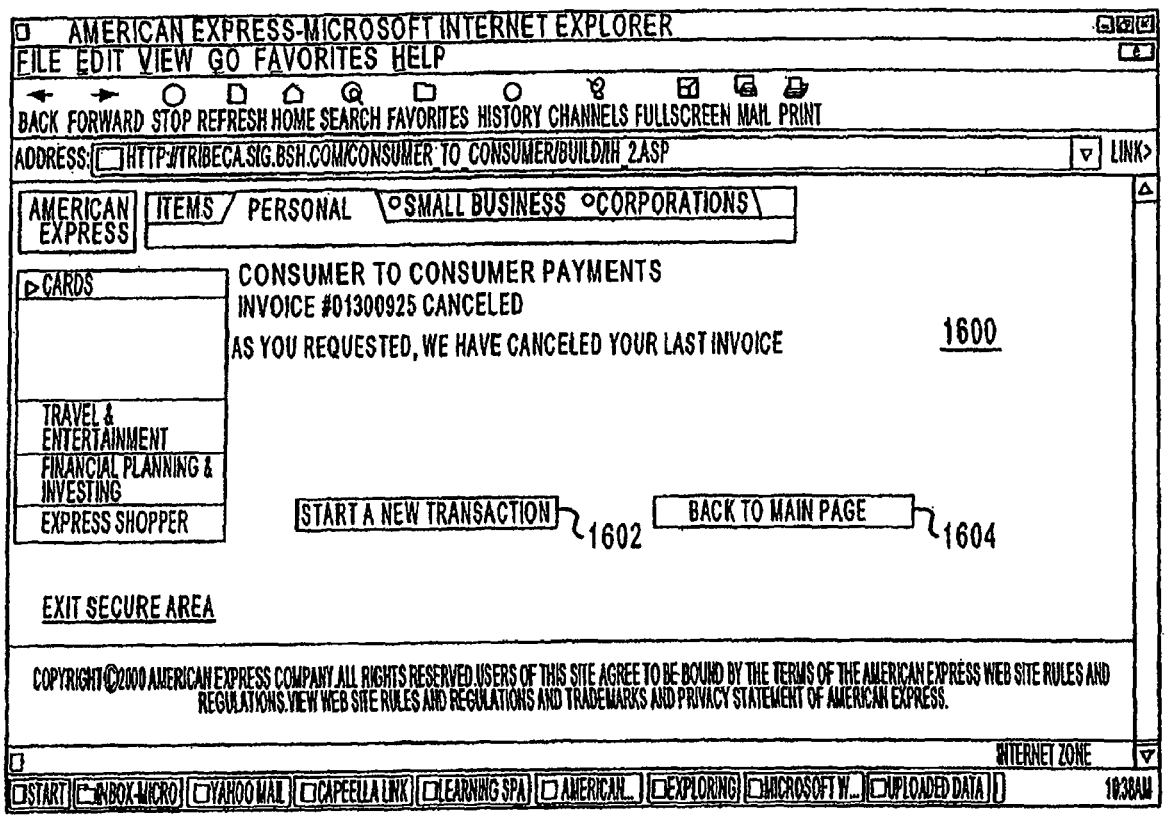
FIG. 16 is an exemplary interface for informing a user of the cancellation of a transaction.

FIG. 13 next illustrates an exemplary process for initiating a commercial transaction between a seller and a purchaser. In this exemplary embodiment, a seller-initiated transaction preferably begins when the seller submits a request to start a transaction, such as by activating tab 1202 of FIG. 12. Once the transaction mechanism receives the request, the transaction mechanism determines whether the seller is a registered user (step 1304). If the seller is not a registered user, the transaction mechanism provides a suitable registration interface (step 1306), such as described above with reference to FIG. 10. If the seller is a registered user, the transaction mechanism provides a suitable means for initiating the transaction (step 1308), such as by providing the exemplary interface of FIG. 14.

The seller then suitably provides the information requested by the transaction mechanism (step 1310). For example, the seller enters the appropriate information which may be requested by various transaction datafields provided by the transaction mechanism through a suitable user interface, such as the exemplary transaction invoice entry page 1400 of FIG. 14. The transaction datafields provided by a suitable transaction entry interface may include suitable datafields of any number or form, such as, for example, a datafield 1402 for a prospective purchaser's email address; a datafield 1404 indicating a final date for the acceptable transfer of funds to the seller; a datafield 1406 for indicating the seller's reference number; a datafield 1408 for a transaction description, such as the identification of any intermediary, like eBay, which may be involved in the transaction; datafields 1410 for a description of the particular items that will be the subject of the transaction; datafields 1412 for indicating the appropriate quantity of each item described in datafield 1410; datafields 1414 for indicating the appropriate price for each item described in datafield 1410; datafields 1416 for indicating the subtotal amount or extended price associated with the quantity and price for each item described in datafield 1410; a datafield 1418 for indicating a suitable cost for any desired value-added services, such as insurance, dispute resolution, postal tracking, or any other suitable value-added service; a datafield 1420 for indicating the cost associated with any shipping and handling charges; datafield 1422 for indicating any miscellaneous charges that may be associated with the transaction, such as any applicable taxes for example; and a datafield 1424 for indicating a total charge or total amount of funds to be transferred from the purchaser to the seller upon completion of the transaction. Additional information that may be requested from the Internet user may include the email address of the Internet user, any optional email message intended for the purchaser, and/or any other suitable information.

Additionally, a suitable transaction entry interface may include any number or form of tabs, such as tab 1426 which activates the creation of additional datafields 1410. The additional tab or tabs may be used by the seller to activate or implement any suitable function which may further facilitate the transaction between the seller and the purchaser. For example, transaction invoice entry page 1400 may also include an additional datafield, or tab for accessing an additional datafield, which may request that the seller provide suitable information regarding an escrow release event. Such escrow release event information may include a particular time period within which a purchaser may either accept or reject any items prior to the transfer of funds from the escrow account to the seller's account, such as a particular number of days after the purchaser receives goods, services, or other value from a suitable shipping agent.

In addition to entering the appropriate information which may be requested by the various transaction datafields provided by the transaction mechanism, the seller preferably is further requested to select a suitable financial account which will ultimately receive the funds transferred from the purchaser at the completion of the transaction. Preferably, the various options presented to the seller on the transaction entry interface reflect the financial account or accounts provided by the seller during the seller's registration with the transaction mechanism, as described above. The financial account selection options may include any suitable selection options which provide the transaction mechanism with the appropriate information. As illustrated in exemplary transaction invoice entry page 1400, financial account selection options may include selection options 1428 and 1430 which preferably indicate the type of financial account 1428, such as a credit card or a demand deposit account (DDA), and the financial account identifier 1430, such as a credit card number or a DDA number.

As one skilled in the art will appreciate, the above described transaction entry interface, as well as any or all other aspects of the present invention, may include any suitable form of encryption and/or other security measures either currently known or hereafter devised.

Once the seller completes a suitable transaction entry interface, the seller may either submit or cancel the transaction invoice entry (step 1312). If the seller cancels the transaction invoice entry, such as by activating tab 1432 of FIG. 14, the seller is returned to the transaction mechanism main page (step 1314), such as the exemplary transaction mechanism main page illustrated in FIG. 11. If the seller submits the transaction invoice entry page to the transaction mechanism by activating, for example, a suitable tab, such as tab 1432, or by pressing the enter key on a suitable input device, a transaction invoice is then displayed by the transaction mechanism (step 1316). The transaction invoice may include any suitable information entered by the seller on the transaction entry interface and any other relevant information, such as any transaction or service fees charged by the transaction mechanism. As illustrated in the exemplary transaction invoice 1500 of FIG. 15, such information may include any or all of the entries corresponding to the datafields described above with reference to FIG. 14. In addition, the transaction invoice may include an invoice number 1536 which may be automatically assigned by the transaction mechanism; an additional service fee amount 1538 which may be suitably deducted from the amount of funds transferred from the purchaser; a total amount 1540, net of fees, owed to the seller at the completion of the transaction; the date 1542 that the transaction invoice was created; and a status indicator 1544, which may include any suitable indicator of any suitable status that may be relevant to the transaction as of the display date of the transaction invoice, such as any of the exemplary status indicators illustrated beneath status key 1546 (i.e., paid, waiting on purchaser, declined by purchaser, and expired).

After the seller completes a review of the transaction invoice, the seller may either decline or accept the transaction invoice (step 1318). If the seller declines the transaction invoice, such as by suitably activating tab 1548 of FIG. 15 for example, a suitable transaction interface is displayed (step 1319), such as exemplary cancel transaction page 1600 of FIG. 16, which may provide suitable means, such as tabs 1602 and 1604, for either initiating a new transaction or returning to the transaction mechanism main page. If the seller accepts the transaction invoice, such as by suitably activating tab 1550 of FIG. 15 or pressing the enter key on a suitable input device for example, the transaction invoice is suitably stored by the transaction mechanism in a suitable storage device (step 1320). Then, the transaction invoice is preferably transmitted to both the purchaser and the seller by any suitable method, such as by email, facsimile, mail, and/or the like (step 1322). Preferably, the transaction invoice is transmitted via email to the respective email addresses of the purchaser and the seller.

Figure 17:
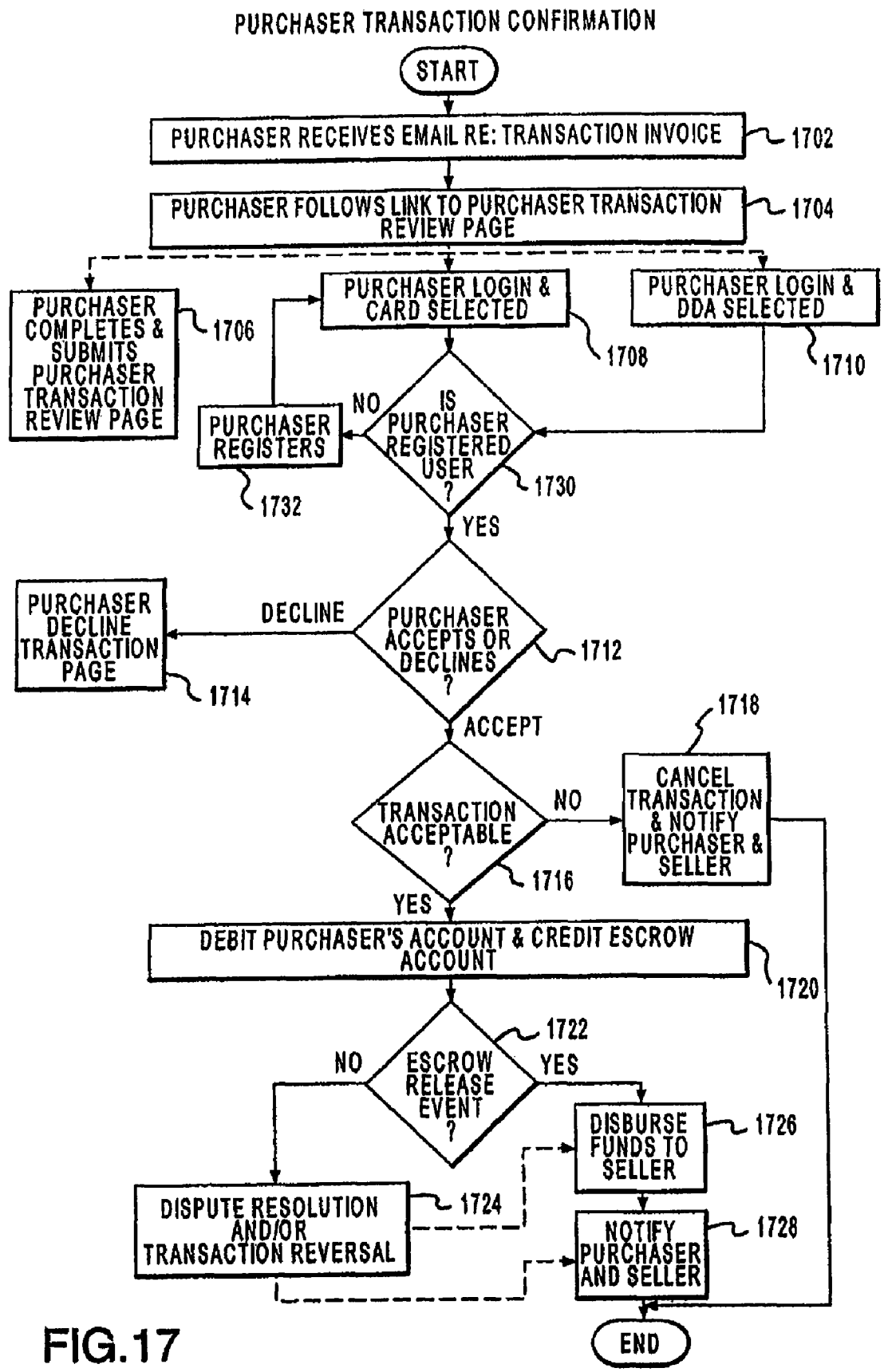
FIG. 17 is a flowchart representing an exemplary purchaser transaction confirmation.
Figure 18:
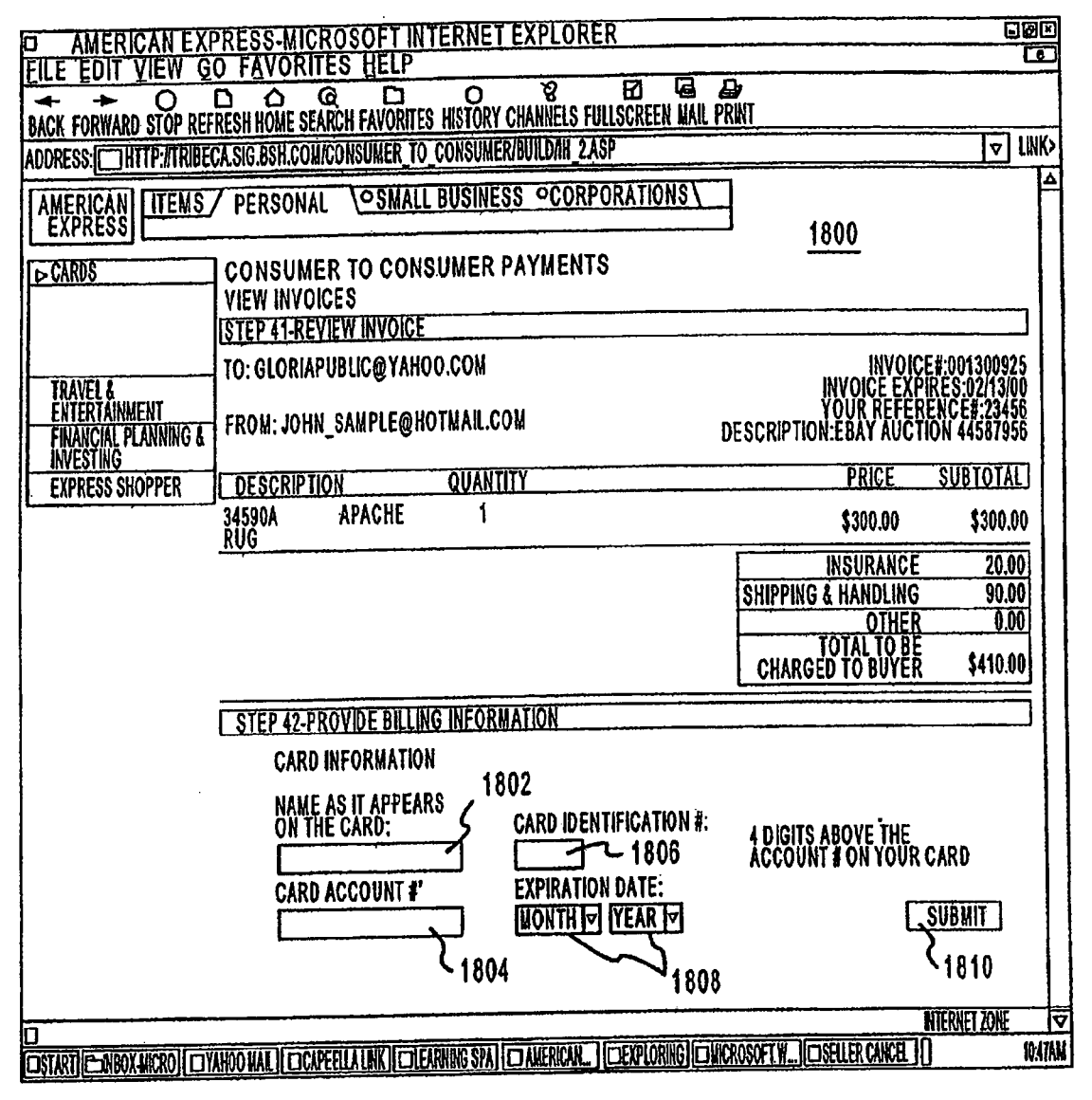
Figure 20:
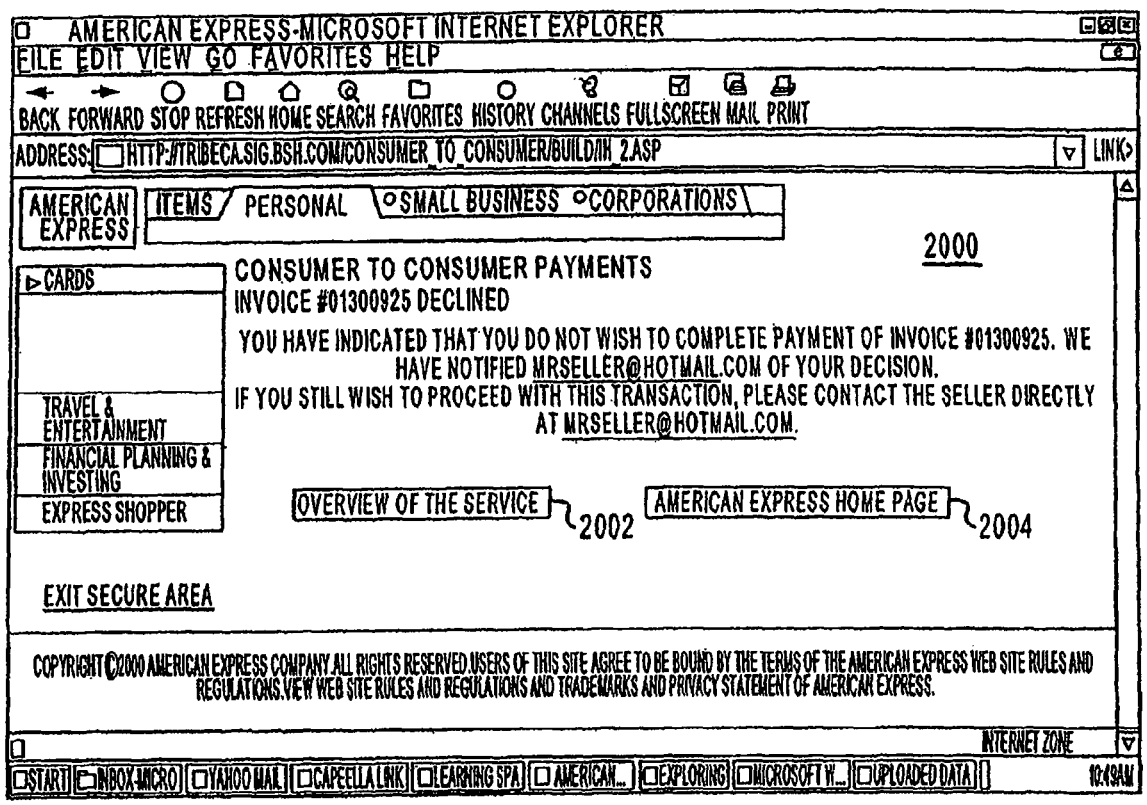
FIG. 20 is an exemplary interface for informing a user of the non-acceptance of a transaction.

Once the seller's transaction invoice is transmitted to the purchaser, the transaction may be suitably completed when the purchaser accepts the transaction. In the exemplary embodiment illustrated by the flowchart of FIG. 17, when the purchaser receives a transmission from the transaction mechanism regarding the transaction invoice (step 1702), such as an email transmission having a hyperlink to a suitable purchaser transaction interface, the purchaser may follow the link to the transaction interface (step 1704), such as the exemplary purchaser transaction review page 1800 of FIG. 18, to review the terms and conditions of the transaction as set forth by the seller. As illustrated in FIG. 17, a purchaser may accept a transaction by one of at least three methods, wherein the methods are indicated by phantom lines to represent the purchaser's optional courses of action. First, the purchaser may accept the transaction using a suitable card without logging into the transaction system (step 1706). Second, the purchaser may accept the transaction by suitably logging into the transaction system and selecting a suitable card to transfer funds to the seller (step 1708). Finally, the purchaser may accept the transaction by suitably logging into the transaction system and selecting a suitable DDA to transfer funds to the seller (step 1710).

In the first case, the purchaser accepts the transaction with a suitable card without logging into the transaction system. If the transaction terms and conditions are acceptable to the purchaser, the purchaser suitably completes the purchaser transaction review page (step 1706) by providing information regarding the purchaser's card to effect a suitable transfer of funds from the purchaser's card account to the financial account of the seller. As illustrated in exemplary purchaser transaction review page 1800 of FIG. 18, the purchaser enters the appropriate information which may be requested by various transaction datafields provided by the transaction mechanism on the purchaser transaction review page 1800. The transaction datafields provided by the purchaser transaction review page may include suitable datafields of any number or form, such as, for example, a datafield 1802 for the purchaser's name as it appears on the card; a datafield 1804 for indicating a card account number; a datafield 1806 for providing a card identification number, such as the four digits that are frequently printed on the card above the card number; and datafields 1808 for indicating the card's expiration date.

Additionally, purchaser transaction review page 1800 may include any number or form of additional tabs or datafields. The additional tabs or datafields may be used by the purchaser to implement any suitable function which may further facilitate the transaction between the seller and the purchaser. For example, purchaser transaction review page 1800 may also include an additional datafield, or tab for accessing an additional datafield, which may permit the purchaser to provide or modify information regarding an escrow release event. Such escrow release event information may include a particular time period within which a purchaser may either accept or reject any items prior to the transfer of funds from the escrow account to the seller's account, such as a particular number of days after the purchaser receives goods, services, or other value from a suitable shipping agent. If a purchaser modifies or adds information to the purchaser transaction review page, such as modifying or adding information regarding an escrow release event, the transaction flow as described herein preferably includes an additional communication or transmission of the transaction terms to the seller so that the seller is given a suitable opportunity to either accept or decline the modified terms and conditions of the transaction.

After the purchaser has suitably entered the requested information, the purchaser suitably submits the purchaser transaction review page to the transaction mechanism, such as by activating tab 1810 or pressing the enter key on a suitable input device for example. Once the purchaser's card information profile has been completed and the purchaser transaction review page is submitted, the transaction mechanism displays a suitable transaction invoice, such as exemplary purchaser transaction invoice 1900 of FIGS. 19A and 19B. At this point, the purchaser may either accept or decline the transaction (step 1712). If the purchaser declines the transaction, such as by suitably activating tab 1902 of exemplary purchaser transaction invoice 1900, a suitable interface is displayed (step 1714), such as exemplary purchaser decline transaction page 2000 of FIG. 20, which may provide any suitable information or means for acquiring information, such as tabs 2002 and 2004.

If the purchaser accepts the transaction, the transaction mechanism performs a suitable card authorization/authentication routine, which may include suitable credit risk and fraud risk analyses (step 1716). If the transaction is unacceptable, either due to a potential fraud risk or a credit risk, the transaction mechanism cancels the transaction and suitably notifies, such as by email, both the purchaser and the seller (step 1718). If the transaction is acceptable, the transaction mechanism suitably debits the purchaser's account. Preferably, the transaction mechanism then credits an appropriate escrow account (step 1720), pending notification by either the purchaser and/or a shipping agent that any defined escrow release event has transpired (step 1722). If the defined escrow release event transpires, the transaction mechanism suitably disburses the appropriate funds to the seller's financial account (step 1726) and notifies both the purchaser and the seller that the transaction has been completed (step 1728). However, if an escrow release event has been defined during the transaction by either the transacting parties or a suitable third party and the escrow release event is not satisfied, the transaction mechanism either reverses the transaction, such as by performing a suitable chargeback or some other suitable transaction reversal procedure, or follows a suitable dispute resolution protocol, as described above (step 1724). As illustrated in phantom lines in order to represent alternative process flows, if any dispute between the parties is favorably resolved, suitable funds may be disbursed to the seller (step 1726) and the parties may be notified of the completion of the transaction (step 1728). However, if any dispute is not favorably resolved, or if the most appropriate resolution is cancellation of the transaction, the transaction is suitably terminated or otherwise reversed and the purchaser and seller are suitably notified of the termination and/or reversal of the transaction (step 1728).

In the second case, the purchaser accepts the transaction by logging into the transaction system and selecting the option of transferring funds to the seller from the purchaser's card (step 1708). Alternatively, the purchaser accepts the transaction by logging into the transaction system and selecting the option of transferring funds to the seller from the purchaser's DDA (step 1710). In either of these situations, the transaction mechanism suitably processes the purchaser's login request and determines whether the purchaser is a registered user (step 1730). If the purchaser is not a registered user, the transaction mechanism provides a suitable registration interface (step 1732), such as described above with reference to FIG. 10. If the purchaser is a registered user, the transaction mechanism then performs steps 1712 through 1728, as described above.

Although the exemplary embodiments described herein may disclose an exemplary seller-initiated transaction, one skilled in the art will appreciate that the present invention is not so limited and may be readily implemented by means of any suitable purchaser-initiated transaction and/or any suitable third-party-initiated transaction, such as an intermediary-initiated transaction.

The present invention contemplates any type of transfer between, or a transaction involving, accounts (e.g., financial accounts). In one embodiment, any such transfers and/or transactions are partially or fully facilitated by a processor. The financial accounts may be owned, controlled or utilized by the same person, different people, related people, employers and employees, corporations or other entities, charities and/or the like. As set forth above, each of the accounts may be issued by the same or different processors (e.g., Account A is a Visa account and Account B is an American Express account) and/or processed by the same or different processors. A "processor" may include any entity which processes transactions, issues accounts (e.g., transaction account issuer), acquires financial information, settles accounts, conducts dispute resolution regarding accounts, and/or the like. For example, a processor may provide data transfer capabilities that transfer data from a customer at a point-of-sale (POS) terminal or internet website to the transaction account issuer and then back to the POS terminal or internet website. The processor, intermediary, and/or account holders may communicate by any device, method or technology discussed herein such as, for example, via internet, cellular phone, personal digital assistant, radio frequency (RFID), infrared and/or the like.

The account code may be distributed and stored in any form of plastic, electronic, magnetic, radio frequency, wireless, audio and/or optical device capable of transmitting or downloading data from itself to a second device. A customer account number may be, for example, a sixteen-digit credit/charge card number, although each credit provider has its own numbering system, such as the fifteen-digit numbering system used by American Express. Each issuer's transaction account numbers comply with that company's standardized format such that the company using a fifteen-digit format will generally use three-spaced sets of numbers, as represented by the number "0000 000000 00000". The first five to seven digits are reserved for processing purposes and identify the issuing bank, card type, etc. In this example, the last (fifteenth) digit is used as a sum check for the fifteen digit number. The intermediary eight-to-eleven digits are used to uniquely identify the customer. A merchant account code or an account number for any party discussed herein may be, for example, any number or alpha-numeric characters that identify a particular merchant for purposes of card acceptance, account reconciliation, reporting, or the like.

The transfers discussed herein may be related to a purchase transaction, an exchange of an item (e.g., good, service, information, experience, access, entertainment, etc), no item exchange, a loan to another account (e.g., debiting a loan amount from a first account and charging a, loan amount to a second account), transferring credit to another account, cost splitting, budgeting, spend compartmentalization, gifting, currency exchanges, currency exchange rates, loyalty points, monetary equivalents, non-monetary items and/or the like. Various notifications may be provided by any party discussed herein, using any technology discussed herein, and/or in association with any action or non-action discussed herein. The transaction may include a registration process for one or more parties, compliance with additional terms and conditions (which may be set by any party discussed herein), tracking any portion of the process, and/or a credit, qualifying or other fraud/security analysis.

In one embodiment, the transaction may not involve the exchange of any items. The transfer may be between accounts owned or controlled by the same entity or person for the purposes of cost splitting, budgeting, and spend compartmentalization. In one embodiment, an account holder may apportion certain charges, rebates, credits, credit limits, available credit, etc among various accounts. For example, an account holder may desire to transfer college expenses to a first account, business expenses to a second account and personal expenses to a third account. If an account holder owns two businesses, the account holder may divide a charge for a printer among a first account associated with a first business and a second account associated with a second business. In another embodiment, a first and second account holder may attend a dinner, yet a first account holder charges the dinner to her account. The first account holder can then split the cost of the dinner by transferring, using the methods discussed herein, any portion of the dinner charge to the account of the second account holder. The cost splitting may occur upon authorization of the charge, submission of the charge, settlement of the charge, or any time subsequent to the first account holder incurring the charge. The cost splitting may also be pre-arranged such that a rule is set to automatically transfer a portion of the charge to the first account to the second account (e.g., when a two person sales team often entertains clients).

The transaction may involve crediting an account; offsetting a charge on an account; reducing an amount owed on an account; increasing or decreasing a credit limit; increasing or decreasing an available balance; increasing or decreasing a feature; increasing, decreasing, removing or implementing a restriction or limitation; charging interest on any amount of feature discussed herein; charging or deducting a transaction fee; and/or changing a feature or charge for a second party based upon payment of a charge by a first party.

Such increases of a credit limit, etc may include increasing a credit limit by an amount greater than equal to or less than the corresponding decrease. The credit, debit, increase or decrease may also occur in real time, batch mode, at a predetermined time or random time. An exemplary system and method for adjusting a credit limit or available funds is disclosed in U.S. Pat. No. 6,796,497, issued on Sep. 28, 2004 and entitled "System And Method For Facilitating A Subsidiary Card Account," which is hereby incorporated by reference.

The following is an example of converting a charge to credit (for a second party based upon payment of a charge by a first party), using the present invention. A first party having a Visa account may transfer $50 from the Visa account to an American Express account of a second party. The Visa account is charged $50 and the American Express account is credited $50. The next billing statement for the Visa account will show a $50 charge for which the first party needs to remit a payment. Prior to the first party remitting payment to Visa to pay for the charge, American Express may increase the available credit (or increase the credit limit) on the second party's American Express account. Increasing the available credit is a precautionary measure in that it will allow the second party to incur charges for an additional $50, but the second party is still incurring those charges based on the second party's creditworthiness with American Express. However, after the first party remits payment to Visa, then Visa will be able to settle the $50 with American Express. Because American Express now obtained the $50 of funds from Visa, American Express converts the $50 increase of available credit to a $50 credit on the second party's account. If the second party does not partially or fully use the $50 credit for a period of time, then American Express may provide interest on the $50 and deposit the interest into the second party's account as additional credit (or deposit the interest into any other account, e.g., savings account, etc).

The accounts may include a transaction card account, an escrow account, a digital cash account, a demand deposit account, a credit line, a line of credit, checking account, savings account, a gift card account, a pre-paid account, a credit union account, a bank account, an investment account, and/or a money market account. The financial account processor may include a transaction account issuer, charge card issuer, credit card issuer, debit card issuer, gift card issuer, bank, lender, credit union, and/or a third party issuer under contract with the financial account issuer.

Any of the account codes or account identifiers discussed herein may include single-use, temporary, proxy, limited-use, restricted, pre-authorized, partial authorized and/or other types of account codes or transaction accounts, and/or identifiers selected from a pool of account numbers, identifiers associated with manual override authorizations. For example, the present invention contemplates using the methods, systems, account codes and/or transaction accounts discussed in U.S. patent application Ser. No. 10/711,827 filed on Oct. 7, 2004 and entitled "Limited Use Pin System And Method"; U.S. patent application Ser. No. 09/906,456 filed on Jul. 16, 2001 and entitled "Method And System For Facilitating The Anonymous Purchase Of Goods And Services From An E-Commerce Website"; and U.S. patent application Ser. No. 09/800,461 filed Mar. 7, 2001 and entitled "System for Facilitating a Transaction"; U.S. Pat. No. 6,901,387 issued on May 31, 2005 and entitled "Electronic Purchasing Method And Apparatus For Performing The Same"; U.S. patent application Ser. No. 10/391,689 filed on Mar. 19, 2003 and entitled "Methods and System for Facilitating a Transaction"; U.S. patent application Ser. No. 10/724,940 filed on Dec. 1, 2003 and entitled "Method and System for Completing Transactions Involving Partial Shipments"; U.S. patent application Ser. No. 10/801,765 filed on Mar. 16, 2004 and entitled "Method and System for Manual Authorization"; U.S. Pat. No. 5,991,750 issued on Nov. 23, 1999 and entitled "System and Method for Pre-Authorization of Individual Account Transactions", and, U.S. Pat. No. 6,796,497 issued Sep. 28, 2004 and entitled "System And Method For Facilitating A Subsidiary Card Account," all of which are hereby incorporated by reference in their entirety.

In one embodiment, any of the accounts discussed herein may also include a flexible limit subsidiary card account. In particular, the account may allow a parent to provide funds to a subsidiary and to at least partially control the subsidiary's spending capacity. The system for administering a subsidiary card account includes a parent and an administrator. The parent, which is responsible for a related credit instrument, e.g., a parent account, is configured to communicate a request for a credit card account to be issued to a subsidiary. The administrator is configured to receive the request from the parent and to facilitate the establishment and issuance of the subsidiary card account. The administrator is also configured to facilitate determination and adjustment of appropriate spending power for the parent account and spending capacity for the subsidiary card account in accordance with a predetermined set of rules. An exemplary set of rules may require an allocation of risk between the administrator and the parent whereby the spending power of the parent account is reduced by an amount that is less than the credit line established for the related subsidiary card account, in accordance with an allocation of risk to the administrator. In addition, an exemplary administrator is further configured to receive and facilitate execution of a request from the parent to define, modify, and/or terminate the spending and/or debt accumulation limits, i.e., capacities, for the subsidiary card account.

In another embodiment, any of the accounts discussed herein may also be associated with a proxy account number. The account holder may obtain a secondary transaction number that is associated with a cardholder's primary account, (e.g., charge card), wherein the cardholder presents or transmits the transaction number—not the primary charge card number—to the merchant to initiate a transaction.

More particularly, the system involves the process of registering a cardholder (if not already pre-registered) to participate in a transaction system; generating a secondary transaction number and issuing this number to the cardholder, where the cardholder presents this number to another party or intermediary (e.g., to complete a transaction); the transaction mechanism processes this secondary transaction number, similar to any other credit card number, where the number is typically presented to the credit card provider for authorization. Throughout this process, the cardholder's primary charge card number is never passed to the merchant or any other third party. Additionally, the secondary transaction number may also carry with it certain limitations-on-use conditions, where the transaction is not authorized unless these conditions are met.

In generating a secondary transaction number, upon a cardholder's request, the card provider generates a random number and associates this number with the cardholder's primary charge card account. This instantaneous and immediate generation of a random number allows for the number to be used by the cardholder immediately upon receipt. This process obviates the need for separate activation of the secondary transaction number, and minimizes the possibility that a secondary transaction number, once issued, will not be utilized because the cardholder or card provider failed to "activate" it. During the authorization phase of the transaction process, the issuer (e.g., transaction mechanism) receives the authorization request and verifies that certain limitations-on-use conditions, if any, have been satisfied. If the conditions have been satisfied, the request is approved and the issuer sends the merchant an approval code. If conditions have not been met, the request is declined. Although the request is declined, in an exemplary embodiment, the secondary transaction number is not "deactivated," and, as a result, may still continue through the payment process. An exemplary settlement process of the present invention involves receiving a request from a merchant to be paid for a particular transaction and paying the merchant. As noted above, even a secondary transaction number that has not been authorized or that has been denied authorization by the issuer, may proceed through settlement, with the incumbent risk to the payee that the transaction (if not accompanied by a valid approval code) may later be charged back to the payee if the transaction is ever disputed. During the settlement process, the accounts payable system pays the payee (intermediary, second party, etc), referencing only the secondary transaction number. However, prior to the accounts receivable processing, the secondary transaction number is replaced with the primary account for cardholder billing. The account holder's statement may reflect, as desired, the secondary transaction code(s), the primary account code(s), all codes or any combination of these codes.

The dispute handling and customer service processes of an exemplary embodiment of this invention enable customer service representatives to retrieve information and initiate customer or merchant inquiries based on the primary account number, the secondary transaction number or other transaction specific information provided by either the cardholder or the merchant. Therefore, the account holder may provide either the primary account number or the secondary transaction number to the customer service representative to initiate a dispute. With either number, the representative is able to look-up the associated account number and account information. The system provides seamless integration of the secondary transaction number and the primary account (i.e., charge card) number to ensure that the payee only sees statements, reports, letters, or financial adjustments bearing the secondary transaction number—not the charge card number, while the account holder need only reference the primary charge card account. Additionally, it is through the dispute handling process that the account holder may dispute a transaction involving, inter alia, an unauthorized use of the secondary transaction number and it is during this process that the transaction amount is charged back to the payee. Other situations involving a payee charge-back may include duplicate billing; service or item not received; item returned; or wrong amount billed.

In another embodiment, any of the accounts discussed herein may also be associated with a limited use account or PIN. In this regard, the present invention facilitates transactions between a first party and a second party by providing the user with a limited use PIN that is associated with a user's primary account and/or PIN number, wherein the user presents or transmits the limited use PIN to the second party, intermediary or the transaction mechanism to initiate a transaction. The transaction processor may process this limited use PIN, similar to any other PIN, where the number is typically presented to the credit issuer to facilitate authorization. Throughout this process, the user's primary charge account number and/or PIN may never be passed to the second party, intermediary or any other third party. Additionally, the limited use PIN may also carry with it certain limitations-on-use conditions, where the transaction is not authorized unless these conditions are met. In generating a limited use PIN, which may be upon a user's request, the issuer may generate a random number and associates this number with the user's primary charge account.

In another embodiment, any of the accounts discussed herein may also be associated with a plurality of transaction account numbers, wherein each of the transaction account numbers is associated with a monetary load value. In one embodiment, the transaction account numbers are stored in a database which has a plurality of records. Each record corresponds to one of the transaction account numbers. None of the records is configured to store identifying information of a purchaser of one of the transaction numbers. A request for an authorization of a purchase transaction having a purchase value is received from a remote computer terminal, wherein the request is associated with one of the transaction account numbers. The method further includes comparing the purchase value to the monetary load value associated with the transaction account number to determine if the purchase value exceeds the monetary load value. The method further includes authorizing the request for an authorization of a purchase transaction. The purchase value is then subtracted from the monetary load value associated with the transaction account number to obtain an updated monetary load value. The updated monetary load value is then associated with the transaction account number.

The presently claimed invention may also incorporate features of a digital wallet as set forth in, for example, U.S. Pat. No. 7,343,351, which is hereby incorporated by reference in its entirety. A digital wallet may be used to facilitate a secure purchase, so the present invention may utilize the digital wallet to facilitate a transaction which, for example, also utilizes a unique anonymous account code.

In another embodiment, any of the accounts discussed herein may also be associated with a pool of account identifiers. For example, a client establishes a master account with an issuer. A pool of limited use account identifiers or secondary account identifiers, that are separate and distinct from the master account, is associated with the master account by the account issuer. Each of the limited use account identifiers may be used by the client to conduct transactions as set forth herein. In one embodiment, to utilize the limited use account identifiers, the client selects an item to purchase from a second party. The client assigns a purchase order code or other identifying character string to the item or items to be purchased, and further indicates an expected financial amount for the transaction. In some embodiments, an expected time of the transaction is also provided. This transaction data is then transmitted to an intermediary in a pre-authorization request. Upon receipt of the request, the intermediary selects one of the available limited use account identifiers from the pool assigned to the particular client's master account. The selected limited use account a identifier is then provided to the client, who in turn, provides it to the second party for effecting payment for the purchase. The second party, in turn, provides the limited use account identifier and a financial amount due to a transaction mechanism, with the transaction being ultimately approved or disapproved by the account issuer or an agent thereof. The authorization for the transaction is dependent upon whether the financial amount, as well as other data received with the limited use account identifier matches the data received with the client's pre-authorization request or is within a predetermined range thereof. In some embodiments, the authorization may depend on an identification of the second party, the amount of the transaction, and/or the date of the transaction. If such data match, the transaction may be approved by the account issuer. After authorization of the transaction, the account issuer generates an account summary including the received financial amount and the purchase order number or other identifier received with the request. The account summary may be transmitted to the client for internal reconciliation. Pursuant to some embodiments, limited use account identifiers may be reissued or reused after a transaction using the limited use account identifier has settled or after a preauthorization of the limited use account identifier has expired.

In further embodiments of the disclosed system, the pool of available limited use account identifiers may be assigned prior to any purchase requests by a client, and the number of available limited use account identifiers may be based on the client's purchasing history, or other anticipated amounts of transactions by the client.

In another embodiment, any of the accounts discussed herein may also be associated with the ability to authorize a portion of a payment based upon a partial shipment of items. More particularly, the method may include receiving an initial authorization request, the initial authorization request including information identifying the transaction including information identifying a second party, the first account identifier and a transaction amount; identifying a pre-authorization record associated with the first account identifier and determining that the transaction amount complies with authorization criteria in the pre-authorization record; and, analyzing the transaction information to determine if the transaction involves a partial shipment. If the transaction involves a partial shipment, then only a portion of the payment may be pre-authorized or authorized.

In another embodiment, any of the accounts discussed herein may also be associated with a pre-authorization record. More particularly, the method may include receiving transaction information defining a transaction, the transaction information including a transaction amount and a second party; selecting an available limited use account identifier from a pool of limited use account identifiers associated with a transaction facilitator to associate with the transaction, wherein the transaction facilitator acts as an intermediary between a first party and second party; establishing a pre-authorization record associated with the selected limited use account identifier, the pre-authorization record including one or more use restrictions based on the transaction information; associating the selected limited use account identifier with the transaction; providing the selected limited use account identifier to the transaction facilitator; subsequently receiving an authorization request; and determining whether to approve the authorization request by comparing terms of the pre-authorization record with the authorization request.

In another embodiment, any of the accounts discussed herein may also be associated with a manual authorization. For example, a previously declined transaction may be authorized by a party (e.g., any party discussed herein), so that a subsequent transaction involving the same account code may be authorized. More particularly, the method may include receiving information identifying a payment account having at least one of an account-level and a corporate-level restriction on use; identifying a first authorization request that involved the payment account, where the first authorization request was declined for a first purchase transaction for failing to comply with the at least one of an account-level and a corporate-level restriction on use; creating, in response to the declined first authorization request, a manual authorization record for the payment account and the first purchase transaction based on information from the first authorization request, and temporarily overriding the at least one of an account-level and a corporate-level restriction on use and allowing approval of a second authorization request involving the payment account and a second purchase transaction that complies with terms of the manual authorization record, including matching information from the first authorization request.

In one embodiment, the system and method enables the allocation of at least a portion (or the entire amount) of a charge and/or loyalty points to different transaction accounts or sub-accounts. For example, a consumer may have a transaction account with Citibank, Bank of America, Visa and American Express. The consumer may also have different American Express accounts (e.g., personal account, corporate account, blue card, gold card, limited use account code, etc) The consumer incurs a charge for $1000, and the charge may be allocated among one or more of the Citibank, Bank of America, Visa, American Express Corporate and American Express Blue card accounts.

The allocation may be based upon one or more of, for example, the amount of the transaction, consumer goals, demographic data, location information, loyalty point information, historical transactions, frequency of transactions, past behavior (of consumer, merchant, etc), payment system (operated by payment processor), consumer transaction fees, late fees, interest rates, merchant transaction fees, exchange rates, costs for using the account, vendor information, company/employer rules, biometric information, authorization levels, consumer information, merchant information, issuer information, payment processor information, the ROC (record of charge), the SOC (summary of charges), a predetermined allocation rule, a dynamic allocation rule (e.g., which changes based upon any of the other factors), consumer and/or employer confirmation (or lack of confirmation), type of account or financial instrument used for the transaction and/or the like.

The allocation may involve any type of account, account code and/or card such as, for example, a corporate card/account (e.g., centralized corporate account paid by the corporation, or corporate account paid by employee then employee is reimbursed), personal card/account, loyalty account, gift card/account (e.g., open card, private label etc, purchasing card/account fuel card/account, shared account (e.g., routes charges and/or loyalty points to a charity account), a third party billing account, a revolving credit card (charges interest but do not need to pay in full), and/or charge card (must pay in full, but no interest). A third party billing account may include consumers providing their phone number (or a code which is based upon, accessed in a look-up table from, or generated from, the consumer's phone number) as the account code such that consumers can bill charges to their Sprint telephone account. The phone number account code and charge information is routed to Sprint to allow Sprint to handle the account receivable from the consumer. The payment processor pays the merchant and enters into an arrangement with Sprint to settle the charges (e.g., prior to or after paying the merchant).

The allocation rule may also be, for example, stored on a transaction device, stored on a personal digital assistant, acquired from an employer or third party, generated at the point of sale, associated with a transaction account, stored at the merchant, stored on a server which serves a group of merchants, and/or stored at a payment processor.

In one embodiment, a consumer may use an American Express Corporate account to charge $1000 at a merchant, so the merchant requests authorization and obtains settlement from American Express. However, the system may allocate the charge by charging $500 to the American Express Corporate account, $200 to the Citibank account, $200 to the Bank of America account, $50 to the Visa account, and $50 to the American Express Blue card account. These respective charges may appear on the consumer's billing statements from the various issuers, and American Express may request reimbursement from the other issuers for the respective charges prior to, and/or after settling with the merchant. In another embodiment, American Express may include the entire $1000 on the consumer's billing statement, then transfer the respective portion of the payment remittance (less any transaction fee, etc) to each of the issuers. In one embodiment, the American Express billing statement and/or the other issuer billing statements may indicate how the $1000 charge was allocated, so the consumer is able to track the charges from all issuers involved in the allocation.

The system may also include (or acquire) late fee, payoff requirements and interest rate information related to the various accounts such that the system may determine the optimal allocation of charges to the various accounts, based on consumer goals. For example, if a consumer desires to delay payment of the charges, the system may allocate a larger portion of the charge to a revolving credit card, instead of a charge card that requires payment in full.

The allocation may also be based upon location information. Location information may include the location of the transaction, location of the consumer, location of the merchant, location of the supplier, location of the product, origin of the product (or its components), zip code information, city information, mapping information, global positioning information, and/or the like. For example, a transaction device may include location technology (e.g., a global positioning system), the system may determine location information based on purchase data (e.g., service establishment number, point of sale terminal information, etc), the system may acquire location information from other sources (e.g., consumer location based on information from a cellular phone company, or product origin location based on SKU or UPC information), etc. In one embodiment, if an employee uses an American Express corporate card to purchase fuel for a company car while outside of his sales territory, over a certain purchase frequency, over a certain amount, or on a weekend, the system may allocate at least a portion of the charge to the employee's personal Visa charge card. In another embodiment, the system may determine that the employee historically uses his corporate card to obtain gasoline from a certain gas station in a certain city on Wednesdays, so if the employee tries to use the corporate card to purchase gas on Saturday in Anaheim near Disneyland, the system may allocate at least a portion of the charge to the personal charge account.

With respect to vendor information, in one embodiment, if an employee uses a corporate card to purchase fuel for a company car, the system may determine that the employee is distributing product for supplier A (e.g., based on the day of the week), so the system may allocate a portion of the charge to a sub-account associated with supplier A.

With respect to loyalty points, the system may analyze the loyalty point benefit associated with various accounts, then allocate the charges to maximize the loyalty point benefit. The allocation may consider the consumer goals such as, for example, the desire to obtain a smaller amount of loyalty points in the near term, the desire to obtain a larger amount of points even it may take a longer time to obtain the points, maximize earning or burning of points with certain vendors, etc. For example, a Visa account may allocate 500 points for a purchase of one tank of gas, but an American Express account may allocate 1000 points after purchasing ten plane tickets above $1000, so the system may allocate gas charges to the Visa account and allocate the plane ticket purchases to the American Express account.

The system may allocate the charge based upon the optimal transaction fees charged by a payment processor, or charged in association with a foreign currency exchange. As used herein, a payment processor includes issuers, acquirers, settlement systems and other systems which facilitate authorizing merchant transaction requests, processing settlement requests and/or handling dispute resolution. For example, the system may determine the optimal payment processor to facilitate the transaction based upon optimal transaction fees for the particular accounts contemplated for the transaction. In contrast to pre-selected accounts, the system may also suggest or allocate the charges among certain accounts based upon optimal transaction fees. As one skilled in the art will appreciate, "optimal" transaction fees may include reduced fees, but the optimal fees may be based on other factors such as, for example, bulk discounts, processing at certain time periods, meeting certain requirements, involving certain purchases and/or the like. Additional features related to determining transaction fees may be found in U.S. Ser. No. 12/264,789, entitled "Customized Financial Transaction Pricing" filed on Nov. 4, 2008, and additional features related to determining the optimal payment processor may be found in U.S. Ser. No. 11/164,444, entitled "Systems And Methods For Locating A Payment System Utilizing A Wireless Point Of Sale Device" which was filed on Nov. 22, 2005, all of which are hereby incorporated by reference.

The allocation may be implemented using a pre-defined rule; selecting or entering a rule via a webpage, online or otherwise submitting a request (e.g., via email, fax, cell phone, customer service representative, etc); a message sent to and/or from a personal digital assistant; a confirmation, denial or non-response to an allocation request; and/or an allocation request sent to a consumer, relative/guardian, employer, payment processor or third party. For example, the consumer may enter information into a webpage regarding a pre-determined percentage or amount to allocate to various accounts for certain transactions. The various scenarios and options discussed herein may be included as drop-down lists, such that the consumer may choose various alternative arrangements based on the specific situations.

For example, the consumer may establish that 50% of a charge over $250 should be allocated to the Visa corporate card when the consumer is in California on any Wednesday, 35% of the charge should be allocated to the company purchasing card if the expense relates to office supplies, and 15% of the charge should be allocated to the consumer's personal MasterCard revolving credit card during promotional periods when it awards over 2 points per dollar purchased, but only until 10,000 points are earned, then the 15% should be allocated to the consumer's Bank of America account.

The system may also suggest an allocation. The system may suggest the allocation prior to, during or after a transaction. The system may also suggest an allocation based on past behavior. For example, if the consumer previously allocated a certain percentage of an office supply charge to his Citibank card, and a certain percentage of his gas expenses to his American Express corporate card, then the system may suggest a similar allocation during an office supply transaction (e.g., suggestion appears on the POS terminal, or sent to the consumer's cellular phone) or the system may suggest a similar allocation when the consumer is establishing the allocation rules online.

In another embodiment, an employer may establish that any charge on the company Visa corporate card over $500 generate a notification to the manager (e.g., Blackberry device). The system may already have stored information related to the employee's charge accounts, so system displays the various charge accounts on the manager's Blackberry, along with the employee's transaction history and current charge request. The manager can then analyze how much the employee already spent on entertaining a certain client, then the manager can indicate an allocation of the charge among the employee's personal and business charge accounts. The system may also include the employee having a second approval or a method for contesting the allocation by the employer. Additionally, if the manager does not reply within a certain time period, then the system may allocate the charge based upon a "no reply" allocation rule.

The system may also enable one or more of the transaction account issuers or payment processors to participate in any phase of the transaction (e.g., pre-authorization, authorization, settlement, etc). For example, if the consumer uses an American Express charge card to purchase a product, but a rule exists to allocate 50% of the charge to a Visa account and 25% of the charge to a Bank of America account, then Visa may or may not be involved in the authorization process. In other words, when the authorization request is sent to American Express, another secondary authorization request for at least a portion of the amount (e.g., 50%) may also be sent to Visa (e.g., directly from the merchant, from the consumer, American Express creates or forwards the secondary authorization request to Visa, etc). In one embodiment, American Express may recognize the primary authorization request as associated with a transaction that involves a charge allocation, then American Express may forward at least a portion of the authorization request to Visa. Visa may then create and send a secondary authorization code. The Visa secondary authorization code may be sent back to the merchant directly or to American Express. In one embodiment, the secondary authorization code may indicate that it is only an authorization for a portion of the transaction such that a primary or other authorization code should also be obtained. The parties in such allocated transactions may also utilize one or more pre-authorizations, manual authorizations, limited use account numbers and/or any of the other features set forth herein.

In another embodiment, Visa sends its secondary authorization code to American Express. If American Express accepts the Visa authorization code, American Express incorporates the Visa authorization into the American Express authorization process. American Express then sends one or more authorization codes to the merchant or consumer which reflect the combined authorization of American Express and Visa for at least a portion of the transaction amount or the entire transaction amount.

With respect to settlement, in one embodiment, the merchant may send one settlement request to American Express related to a transaction, American Express settles with the merchant, then American Express seeks reimbursement from the other account issuers of which the charge was allocated. In another embodiment, the merchant sends multiple settlement requests, based upon the allocated transaction, to the respective acquirers in order to facilitate settlement (based upon the various issuers and including the specific issuer authorization code). In another embodiment, to help reduce fraud, American Express obtains partial or full payment for the transaction prior to settling with the merchant. For example, American Express may send an invoice to the consumer, obtain payment from the consumer for the charges, obtain payment from the other issuers involved in the allocated transaction, then American Express would pay the merchant (after American Express received a portion or all of the funds related to the allocated transaction).

Figure 21:
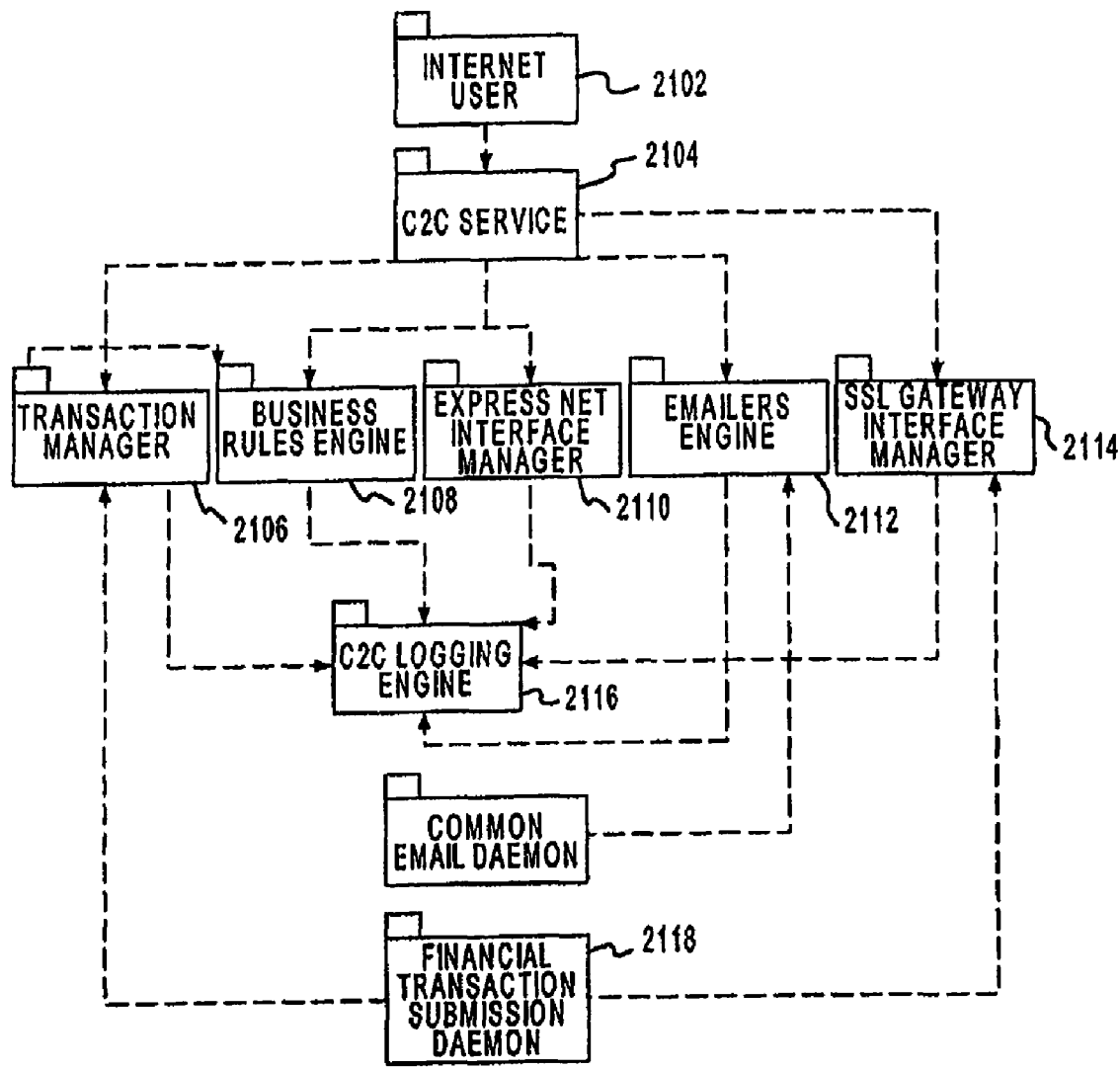
FIG. 21 illustrates an exemplary transaction mechanism in accordance with various aspects of the present invention.

As one skilled in the art will appreciate, the transaction mechanism of the present invention may be suitably configured in any of several ways. It should be understood that the transaction mechanism described herein with reference to FIG. 21 is but one exemplary embodiment of the invention and is not intended to limit the scope of the invention as described above. FIG. 21 illustrates an exemplary transaction mechanism 2100 comprising a C2C Service 2104; a Transaction Manager 2106; a Business Rules Engine 2108; an Express Net Interface Manager 2110; an eMailers Engine 2112; an SSL Gateway Interface Manager 2114; a C2C Logging Engine 2116; and a Financial Transaction Submission Daemon 2118.

The C2C Service 2104 suitably processes initial transaction requests from Internet users 2102. Exemplary processes performed by the C2C Service 2104 include requesting transaction information, such as card and/or DDA information, from an Internet user 2102 who has logged into the transaction system; validating the data entered by an Internet user 2102; and submitting a completed transaction invoice to the Transaction Manager 2106. The C2C Service 2104 communicates with the other components of the system through any suitable communications link, including a network connection such as an Intranet, extranet, and/or the like.

The Transaction Manager 2106 performs a variety of processes which facilitate a transaction between a seller and a purchaser. These processes may include creating transaction invoices and managing them, including updating a particular transaction invoice at the various stages of the transaction process; sending emails to sellers and purchasers using the E-Mailers Engine 2112; and processing requests from the Virtual Point of Sale (VPOS) Capture Daemon for transactions which are eligible for submission to the financial capture systems, as described in greater detail below.

The Business Rules Engine 2108 preferably provides access to a variety of operating standards that may be applied to any given transaction between a seller and a purchaser. The applicable operating standards may include, but are not limited to, any of the following: (1) given a transaction type and a transaction, Business Rules Engine 2108 may return a suitable pricing model to be applied to the transaction; (2) Business Rules Engine 2108 may compute a transaction fee based upon a certain number of basis points, which preferably is a configurable parameter generated from a suitable fee table (for example, one basis point=0.01%, so 375 bp=3.75% of the total price of the transaction); (3) Business Rules Engine 2108 may apply a flat transaction fee; and/or (4) given a transaction and a transaction type, Business Rules Engine 2108 may apply a fraud model to the transaction, wherein the exemplary fraud model may include any of the following: (a) authorization for the purchaser's part in the transaction, including billing address verification and 4DBC verification of the purchaser; (b) verification of a lack of any relationship between the purchaser and the seller, wherein all transactions showing a relationship (such as "self" or other personal relationship) between the purchaser and the seller may be "failed" or otherwise terminated; (c) application of a 3-strike rule, wherein the transaction is failed or terminated if a $3^{rd}$ attempt to authorize the transaction fails and an email is sent to the seller providing an explanation for the cancellation of the transaction; and (d) verification that the transaction amount has not exceeded any prescribed limits, such as a limit on the transaction amount and/or a limit regarding the maximum number of transactions that may be conducted between a first party and any other party during some defined period of time (such as per day, per week, per month, etc.). In one embodiment, any applicable transaction limits are provided as configurable parameters by the Business Rules Engine 2108.

In the case of both verification of the purchaser's billing address and verification of purchaser/seller non-relationship, a 'system not available' response is possible, in which case the Business Rules Engine 2108 may recommend either a time-out or that the transaction be terminated.

In one embodiment, the non-relationship verification is the first process sent to the credit authorizations system (CAS) from the transaction mechanism 2100, since the data for this process preferably is contained within the CAS rather than a separate cardmember system (IMS, Triumph). The CAS is an online system which analyzes charge requests and either approves the charge requests or refers them to an Authorizer for a decision. CAS preferably contains a negative file, a delinquency file, and an accumulative file. If the purchaser and seller pass the non-relationship verification, then an authorization request (with AAV and 4DBC) is sent. The authorization request preferably involves CAS accessing a suitable cardmember system to verify the billing address.

The Express Net Interface Manager 2110 communicates with the Express Net, the utility which processes user registration and manages the accounts of registered users. The Express Net Interface Manager 2110 accesses the Express Net and acquires any suitable user data which may be desired to process a particular pending transaction. Preferably, the Express Net Interface Manager 2110 acquires a list of the Internet user's registered cards and/or DDAs as well as other unique data pertaining to the Internet user 2102, wherein the exemplary information may be used to process the transaction.

The eMailers Engine 2112 preferably sends suitable email notifications and/or confirmations to both the seller and the purchaser in the case of either a merchandise transaction or a transfer of funds. For example, the eMailers Engine 2112 may send an email comprising a notification which may: (1) notify a purchaser, preferably with an encrypted URL, of a transaction or funds transfer initiated by a seller and provide suitable means for the purchaser either to accept or decline the transaction or funds transfer; (2) copy the seller on the notification sent to the purchaser; and/or (3) indicate to both a seller and a purchaser that the purchaser has either accepted or declined a transaction or transfer of funds.

The SSL Gateway Interface Manager 2114 preferably communicates with the SSL Gateway, which preferably includes a Payment Gateway Client Class and a CAS Authentication Component. The SSL Gateway is a message and file distribution system which accepts authorization requests online and distributes those authorization requests to the proper authorization system. The Payment Gateway Client Class preferably processes all of the protocol and transport level responsibilities that are may be used for communicating with the Payment Gateway Server, which operates as a part of the SSL Gateway. Preferably, the defined protocols include the addition of a MIME header to all XML messages sent to the payment gateway and the use of TCP/IP sockets for communication with the Payment Gateway. The CAS Authentication Component preferably is responsible for performing the CAS financial authorization processes (ISO8583) as well as performing the CAS non-relationship verification processes based upon the new ISO message.

The C2C Logging Engine 2116 preferably audits and error logs all events in the transaction system 2100. Preferably, the C2C Logging Engine 2116 logs errors in the transaction system 2100 into a flat file. Preferably, the CA Unicenter agent for production support uses this flat file.

Figure 22:
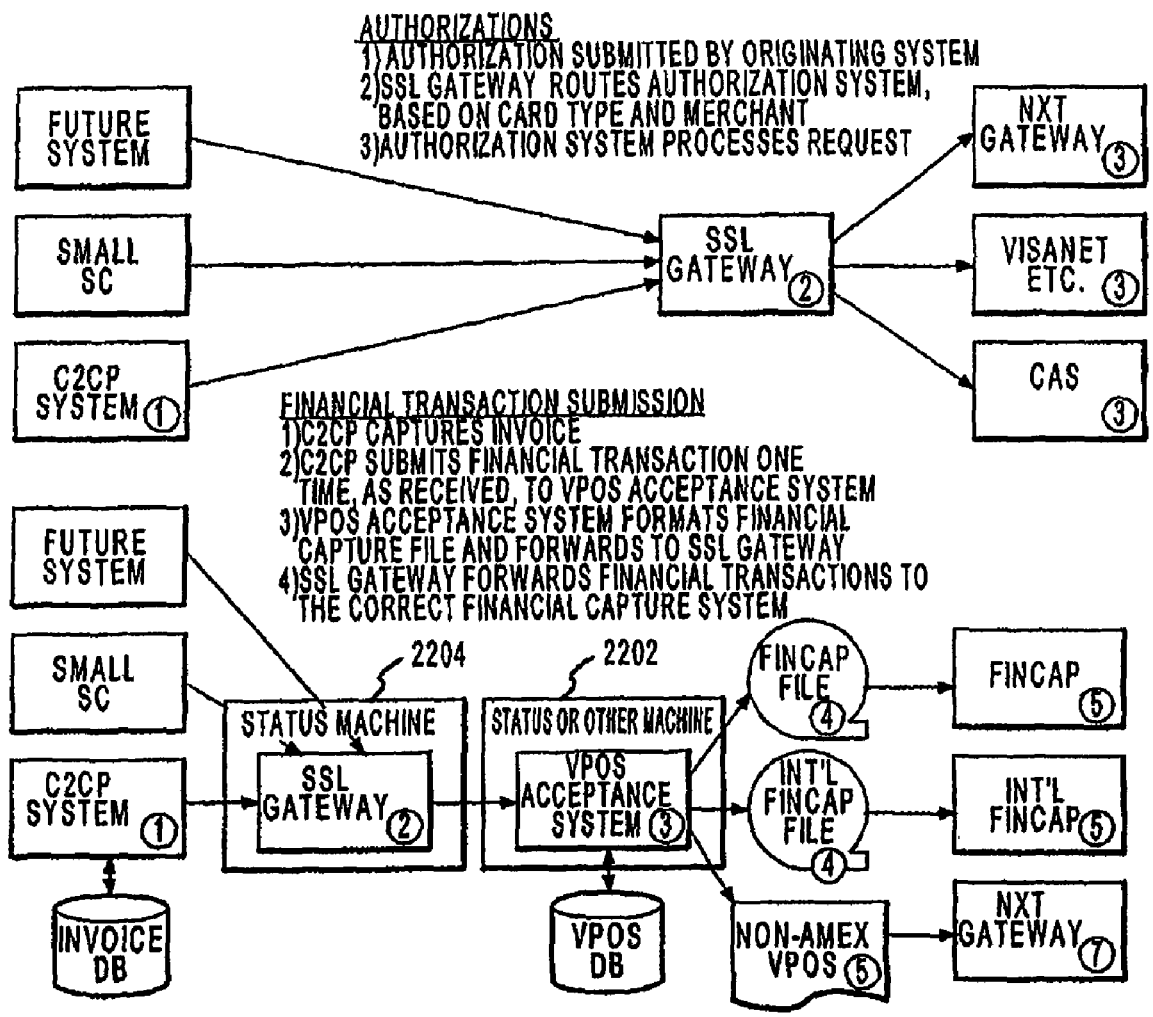
FIG. 22 represents an exemplary system for processing the submission of financial transactions.

The Financial Transaction Submission Daemon 2118 preferably submits each transaction's financial transaction record, such as a credit and/or debit Virtual Point of Sale (VPOS) record that results from a particular card to card or card to DDA transaction, to a VPOS Acceptance System 2202 via the SSL Gateway 2204, as better seen in FIG. 22. Preferably, each individual financial transaction record is submitted to the VPOS Acceptance System as it is received, without being processed as part of a batch file. The VPOS Acceptance System receives the financial transaction record, formats the financial capture file, and forwards the financial capture file to the SSL Gateway. The SSL Gateway then forwards the financial capture file to the appropriate financial capture system. The submission of the financial transaction record preferably is based upon a message-based protocol that is implemented by the VPOS Acceptance System.

Although the invention has been described herein as facilitating commercial transactions between parties residing at remote locations, one of ordinary skill in the art will appreciate that the invention is not so limited and includes the facilitation of commercial transactions between co-located parties.

It should be understood, however, that the detailed description and specific examples, while indicating exemplary embodiments of the present invention, are given for purposes of illustration only and not of limitation. Many changes and modifications within the scope of the instant invention may be made without departing from the spirit thereof, and the invention includes all such modifications. The corresponding structures, materials, acts, and equivalents of all elements in the claims below are intended to include any structure, material, or acts for performing the functions in combination with other claimed elements as specifically claimed. The scope of the invention should be determined by the appended claims and their legal equivalents, rather than by the examples given above. For example, the steps recited in any method claims may be executed in any order and are not limited to the order presented in the claims. Moreover, no element is essential to the practice of the invention unless specifically described herein as "critical" or "essential".

We claim:

1. A method for settling an allocation of an amount associated with a transaction, the method comprising:
    receiving, by a financial account issuer server, a first application for a first financial account from a first party, wherein the financial account issuer server is a processing engine having a non-transitory memory and, wherein the first application comprises fields which include financial account information for establishing the first financial account and transaction management information relating to facilitating transaction management between the first party and a second party;
    facilitating, by the financial account issuer server, creation of the first financial account for the first party and a registration of the first party to participate in the transaction management, wherein the registration includes a first financial account identifier for identifying the first financial account associated with the first party;
    obtaining, by the financial account issuer server, first party credit information from at least one of the financial account issuer server or a third party;
    determining, by the financial account issuer server, that the first party is eligible for obtaining the first financial account based on the first party credit information and the transaction management information;
    obtaining, by the financial account issuer server, first party fraud risk information from at least one of the financial account issuer server or the third party;
    determining, by the financial account issuer server, that the first party is eligible to participate in the transaction management based on a fraud risk analysis of the first party fraud risk information;
    transmitting, by the financial account issuer server, the first financial account identifier to the first party;
    receiving, at the financial account issuer server, a second application for a second financial account from a second party, wherein the second application comprises fields which include financial account information for establishing the second financial account and transaction management information relating to facilitating transaction management between the second party and the first party;
    facilitating, by the financial account issuer server, creation of the second financial account for the second party and a registration of the second party to participate in the transaction management, wherein the registration includes a second financial account identifier for identifying the second financial account associated with the second party;
    obtaining, by the financial account issuer server, second party credit information from at least one of the financial account issuer server or the third party;
    determining, by the financial account issuer server, that the second party is eligible for obtaining the second financial account based on the second party credit information and the transaction management information;
    obtaining, by the financial account issuer server, second party fraud risk information from at least one of the financial account issuer server or the third party;
    determining, by the financial account issuer server, that the second party is eligible to participate in the transaction management based on a fraud risk analysis of the second party fraud risk information;
    transmitting, by the financial account issuer server, the second financial account identifier to the second party;
    receiving, at a first financial account issuer, a request to settle the amount and the first financial account identifier from a merchant associated with the transaction
    acquiring, by the financial account issuer server, an allocation rule associated with the first financial account identifier;
    transforming, by the financial account issuer server, an allocation instruction based on the allocation rule;
    determining, by the financial account issuer server, a first portion of the amount to be debited from the first financial account based on the allocation instruction;
    verifying, by the financial account issuer server, that the first financial account can satisfy the debiting of the first portion;
    debiting, by the financial account issuer server, the first portion of the amount from the first financial account based on the allocation instruction;
    determining, by the financial account issuer server, the second financial account, based on the allocation instruction;

determining, by the financial account issuer server, a second portion of the amount to be debited from the second financial account based on the allocation instruction;

facilitating, by the financial account issuer server, debiting of the second portion of the amount from the second financial account based on the allocation instruction; and sending, by the financial account issuer server, at least a part of the first portion and the second portion to the merchant.

2. The method of claim 1, wherein the sending to the merchant occurs prior to the obtaining the second portion of the amount from the second financial account issuer.

3. The method of claim 1, wherein the allocation rule is based upon at least one of: the amount, consumer goals, demographic data, location information, loyalty point information, historical transactions, frequency of transactions, time period of the transaction, past behavior of consumer, past behavior of merchant, payment system, consumer transaction fees, late fees, interest rates, merchant transaction fees, exchange rates, account fees, vendor information, company guidelines, biometric information, authorization levels, consumer information, merchant information, issuer information, payment processor information, record of charge, summary of charges, consumer confirmation, employer confirmation, lack of confirmation, type of account or financial instrument.

4. The method of claim 1, wherein at least one of the first financial account or the second financial account includes at least one of: a transaction account, an escrow account, a digital cash account, a demand deposit account, a credit line, checking account, savings account, a gift card account, a pre-paid account, a credit union account, a bank account, an investment account, a money market account, a corporate account, personal account, a loyalty account, gift card account, procurement account, fuel account, shared account, a third party billing account, a revolving credit card account or a charge card account.

5. The method of claim 1, wherein the allocation rule is at least one of: stored on a transaction device, stored on a personal digital assistant, acquired from an employer, acquired from a third party, generated at a point of sale, associated with the first financial account, stored in a merchant database, or stored in a payment processor database.

6. The method of claim 1, wherein the allocation rule is at least one of: a pre-defined rule, a dynamic rule, entered via a webpage, or entered via a personal digital assistant.

7. The method of claim 1, wherein the allocation rule at least one of: initiates a notification, or requests a confirmation.

8. The method of claim 1, wherein at least one of: the amount, the first portion or the second portion are included on a billing statement associated with at least one of the first financial account or the second financial account.

9. The method of claim 1, wherein the amount comprises at least one of a monetary amount, a non-monetary amount, loyalty points, or monetary equivalent value.

10. The method of claim 1, further comprising receiving the allocation rule from a consumer associated with the first financial account.

11. The method of claim 1, wherein the first financial account and the second financial account are associated with the same consumer.

12. The method of claim 1, further comprising retaining, by the first financial account issuer, a third portion of the amount as a transaction fee.

13. The method of claim 1, further comprising debiting a transaction fee from at least one of the first financial account or the second financial account.

14. The method of claim 1, further comprising paying interest to at least one of the first financial account or the second financial account based upon on the second portion of the amount allocated to the second financial account.

15. The method of claim 1, wherein the first financial account issuer comprises at least one of a transaction account issuer, charge card issuer, credit card issuer, debit card issuer, gift card issuer, bank, lender, credit union, or a third party issuer under contract with the financial account issuer.

16. The method of claim 1, wherein a second authorization request is received by the second financial account issuer from at least one of the first financial account issuer or a merchant associated with the transaction.

17. The method of claim 1, wherein a second authorization approval is sent from the second financial account issuer to at least one of the first financial account issuer or a merchant associated with the transaction.

18. The method of claim 1, wherein the facilitating debiting comprises sending a request to an issuer associated with the second financial account.

19. The method of claim 1, further comprising transforming the allocation instruction based on the transaction.

20. An article of manufacture including a non-transitory, tangible computer readable medium having stored thereon a plurality of instructions that, in response to execution by a financial account issuer server, cause the financial account issuer server to perform operations comprising:

receiving, by the financial account issuer server, a first application for a first financial account from a first party, wherein the financial account issuer server is a processing engine having a non-transitory memory and, wherein the first application comprises fields which include financial account information for establishing the first financial account and transaction management information relating to facilitating transaction management between the first party and a second party;

facilitating, by the financial account issuer server, creation of the first financial account for the first party and a registration of the first party to participate in the transaction management, wherein the registration includes a first financial account identifier for identifying the first financial account associated with the first party;

obtaining, by the financial account issuer server, first party credit information from at least one of the financial account issuer server or a third party;

determining, by the financial account issuer server, that the first party is eligible for obtaining the first financial account based on the first party credit information and the transaction management information;

obtaining, by the financial account issuer server, first party fraud risk information from at least one of the financial account issuer server or the third party;

determining, by the financial account issuer server, that the first party is eligible to participate in the transaction management based on a fraud risk analysis of the first party fraud risk information;

transmitting, by the financial account issuer server, the first financial account identifier to the first party;

receiving, at the financial account issuer server, a second application for a second financial account from a second party, wherein the second application comprises fields which include financial account information for establishing the second financial account and transaction management information relating to facilitating transaction management between the second party and the first party;

facilitating, by the financial account issuer server, creation of the second financial account for the second party and a registration of the second party to participate in the transaction management, wherein the registration includes a second financial account identifier for identifying the second financial account associated with the second party;

obtaining, by the financial account issuer server, second party credit information from at least one of the financial account issuer server or the third party;

determining, by the financial account issuer server, that the second party is eligible for obtaining the second financial account based on the second party credit information and the transaction management information;

obtaining, by the financial account issuer server, second party fraud risk information from at least one of the financial account issuer server or the third party;

determining, by the financial account issuer server, that the second party is eligible to participate in the transaction management based on a fraud risk analysis of the second party fraud risk information;

transmitting, by the financial account issuer server, the second financial account identifier to the second party;

receiving, at a first financial account issuer, a request to settle the amount and the first financial account identifier from a merchant associated with the transaction;

acquiring, by the financial account issuer server, an allocation rule associated with the first financial account identifier;

transforming, by the financial account issuer server, an allocation instruction based on the allocation rule;

determining, by the financial account issuer server, a first portion of the amount to be debited from the first financial account based on the allocation instruction;

verifying, by the financial account issuer server, that the first financial account can satisfy the debiting of the first portion;

debiting, by the financial account issuer server, the first portion of the amount from the first financial account based on the allocation instruction;

determining, by the financial account issuer server, the second financial account, based on the allocation instruction;

determining, by the financial account issuer server, a second portion of the amount to be debited from the second financial account based on the allocation instruction;

facilitating, by the financial account issuer server, debiting of the second portion of the amount from the second financial account based on the allocation instruction; and sending, by the financial account issuer server, at least a part of the first portion and the second portion to the merchant.

21. A system comprising:

a tangible, non-transitory memory communicating with a processor of a financial account issuer server, the tangible, non-transitory memory having instructions stored thereon that, in response to execution by the processor, cause the financial account issuer server to perform operations comprising:

receiving, by the financial account issuer server, a first application for a first financial account from a first party, wherein the financial account issuer server is a processing engine having a non-transitory memory and, wherein the first application comprises fields which include financial account information for establishing the first financial account and transaction management information relating to facilitating transaction management between the first party and a second party;

facilitating, by the financial account issuer server, creation of the first financial account for the first party and a registration of the first party to participate in the transaction management, wherein the registration includes a first financial account identifier for identifying the first financial account associated with the first party;

obtaining, by the financial account issuer server, first party credit information from at least one of the financial account issuer server or a third party;

determining, by the financial account issuer server, that the first party is eligible for obtaining the first financial account based on the first party credit information and the transaction management information;

obtaining, by the financial account issuer server, first party fraud risk information from at least one of the financial account issuer server or the third party;

determining, by the financial account issuer server, that the first party is eligible to participate in the transaction management based on a fraud risk analysis of the first party fraud risk information;

transmitting, by the financial account issuer server, the first financial account identifier to the first party;

receiving, at the financial account issuer server, a second application for a second financial account from a second party, wherein the second application comprises fields which include financial account information for establishing the second financial account and transaction management information relating to facilitating transaction management between the second party and the first party;

facilitating, by the financial account issuer server, creation of the second financial account for the second party and a registration of the second party to participate in the transaction management, wherein the registration includes a second financial account identifier for identifying the second financial account associated with the second party;

obtaining, by the financial account issuer server, second party credit information from at least one of the financial account issuer server or the third party;

determining, by the financial account issuer server, that the second party is eligible for obtaining the second financial account based on the second party credit information and the transaction management information;

obtaining, by the financial account issuer server, second party fraud risk information from at least one of the financial account issuer server or the third party;

determining, by the financial account issuer server, that the second party is eligible to participate in the transaction management based on a fraud risk analysis of the second party fraud risk information;

transmitting, by the financial account issuer server, the second financial account identifier to the second party;

receiving, at a first financial account issuer, a request to settle the amount and the first financial account identifier from a merchant associated with the transaction;

acquiring, by the financial account issuer server, an allocation rule associated with the first financial account identifier;

transforming, by the financial account issuer server, an allocation instruction based on the allocation rule;

determining, by the financial account issuer server, a first portion of the amount to be debited from the first financial account based on the allocation instruction;

verifying, by the financial account issuer server, that the first financial account can satisfy the debiting of the first portion;

debiting, by the financial account issuer server, the first portion of the amount from the first financial account based on the allocation instruction;

determining, by the financial account issuer server, the second financial account, based on the allocation instruction;

determining, by the financial account issuer server, a second portion of the amount to be debited from the second financial account, based on the allocation instruction;

facilitating, by the financial account issuer server, debiting of the second portion of the amount from the second financial account based on the allocation instruction; and sending, by the financial account issuer server, at least a part of the first portion and the second portion to the merchant.

\* \* \* \* \*